United States Patent [19]

Wical

[11] Patent Number: 5,708,822
[45] Date of Patent: Jan. 13, 1998

[54] METHODS AND APPARATUS FOR THEMATIC PARSING OF DISCOURSE

[75] Inventor: Kelly Wical, Redwood Shores, Calif.

[73] Assignee: Oracle Corporation, Redwood Shores, Calif.

[21] Appl. No.: 454,602

[22] Filed: May 31, 1995

[51] Int. Cl.$^6$ .................................................. G06F 17/27
[52] U.S. Cl. .......................... 395/751; 395/759; 395/793
[58] Field of Search .............................. 395/751, 759, 395/760, 793, 794

[56] References Cited

U.S. PATENT DOCUMENTS

| | | | |
|---|---|---|---|
| 5,056,021 | 10/1991 | Ausbom | 395/759 |
| 5,257,186 | 10/1993 | Ukita et al. | 395/793 |
| 5,383,120 | 1/1995 | Zernick | 395/759 |
| 5,384,703 | 1/1995 | Withgott et al. | 395/793 |

Primary Examiner—Jeffery Hofsass
Assistant Examiner—Andrew Hill
Attorney, Agent, or Firm—Fliesler, Dubb, Meyer & Lovejoy LLP

[57] ABSTRACT

A theme parsing system that determines the thematic context of input discourse is disclosed. Each word used in a language carries thematic information that conveys the importance of the meaning and content of the discourse. The theme parsing system discriminates words and phrases of the input discourse, identifying the type of importance or meaning, the impact on different parts of the discourse, and the overall contribution to the content of the discourse. The thematic conext of the discourse is determined in accordance with predetermined theme assessment criteria that is a function of the strategic importance of the discriminated words. The predetermined thematic assessment criteria defines which of the discriminated words are to be selected for each thematic analysis unit. The discourse is then output in a predetermined thematic format as a different view to a user, giving the topics of the discourse in a topic extractor, generating summarized versions of the discourse in a kernel generator, and identifying the key content of the discourse in a content extractor.

45 Claims, 7 Drawing Sheets

Microfiche Appendix Included
(7 Microfiche, 368 Pages)

METHODS AND APPARATUS FOR THEMATIC PARSING OF DISCOURSE

MICROFICHE APPENDICES

Appendix D, entitled "Theme Parser Code" contains five microfiche with a total number of two hundred and eighty three (283) frames.

Appendix E, entitled "Code Heading" contains two microfiche with a total number of eighty five (85) frames.

APPENDICES AVAILABLE AT THE UNITED STATES PATENT AND TRADEMARK OFFICE

Paper Appendices A, B, C, and F and Microfiche Appendices D and E are available with the corresponding file wrapper at the United States Patent and Trademark Office.

COPYRIGHT NOTICE

Appendices A, B, C, D, E and F contain material which is subject to copyright protection. The copyright owner has no objection to the facsimile reproduction by any one of the Appendices as they appear in the United States Patent and Trademark patent files or records, but otherwise reserves all copyright rights whatsoever.

FIELD OF THE INVENTION

The present invention pertains in general to a discourse analysis system, and more particularly, to a discourse analysis system for determining the thematic context of text.

BACKGROUND OF THE INVENTION

Discourse from a general standpoint is the capacity of orderly thought or procedure. In conversation, it is the orderly flow of ideas wherein certain topics are introduced and grouped in organized manners, and additional information expands on these topics by saying something about them.

One example of a discourse is a book wherein the lowest level of a topic exists in sentences. Generally, a sentence is a grammatically self-contained language unit consisting of a word or a syntactically related group of words that express an assertion, a question, a command, a wish, or an exclamation; that in writing usually begins with a capital letter and concludes with appropriate ending punctuation; and that in speaking is phonetically distinguished by various patterns of stress, pitch and pause. Each sentence in a discourse can be said to have a topic, explicitly stated or implied, and a focus, or something that is being said about the topic.

Analysis of discourse must be initiated at the basic level, that of the sentence—the lowest, complete grammatical and thematic level. A number of systems have been developed for the automated recognition of grammatical information. Systems of this nature typically take the approach that theoretical linguistic formalisms that have been developed to identify correct grammatical constructions can be arranged in a hierarchical structure. This type of approach assumes that language is linear, and that the grammatical context is the primary method for accessing the information in a sentence. However, because the number of combinations of possible linguistic constituents for a sentence escalates exponentially with sentence length, these systems in general are limited to operating on text having a small, well-defined vocabulary or to operating on a more general text but dealing with a limited range of syntactic features.

To solve these problems, such procedures as text annotation have been utilized which generally involve annotation of each word of the sentence with various tags and data codes in the form of a lexicon. However, these systems still utilize a hierarchical structure in that they must apply templates and transformation rules to determine grammatically correct parts of a sentence. Such a system has been described in U.S. Pat. No. 4,864,501, issued to Henry Kucera et al. on Sep. 5, 1989.

In addition, these systems do not recognize the full value of the information in a sentence, that being the sentence's theme—which topic is really being discussed and what is being said about that topic. To understand the thematic information in a sentence, an analysis method is needed that is able to experience all of the subtle nuances that a writer conveys to a reader in less tangible ways. The human mind does not understand information by analyzing the grammatical content of a sentence. Many sentences are identical in grammatical context but are very different because of the specific selection of words and what additional facets of understanding the words add to the understanding of the sentence. The difference does not just influence the topics by introducing another different idea, but also influences the level of importance that each word has in the sentence by indicating new, extra-grammatical, thematic contexts.

In general, past approaches to analyzing the context of a discourse have been from the standpoint of trying to place language, a nonlinear process, into a linear, grammatical structure. Although it is recognized that language is nonlinear, most approaches have attempted to linearize the language and to force it into a hierarchical structure of decision making limited to formalized, linguistic, grammatical rules. For example, Kucera makes some broad ranging decisions of how to parse the grammar of a sentence at various levels and then moves on to another lower level to make another set of decisions, and so on. The problem is that there are many nuances and subtleties in the general relationships of words in a sentence from a contextual standpoint, and a grammatical context by itself is an incomplete solution for determining the full context of a sentence. The thematic context is also required.

Therefore, a system that takes the Kucera approach can never be very accurate since the higher level decisions that are made in the hierarchical approach to analyzing language must by necessity be influenced by very small grammatical rules or relationships that for most sentences have little impact but do in aggregation affect the accuracy of any system, and the resulting contextual interpretation of the sentence is at best minimal without the assessment of the sentence's theme. Therefore, to account for all of these nuances and subtleties would result in diminishing the hierarchical structure of a given analysis system and would be unwieldy, since the number of decisions that must be made at any one level would be unmanageable. This is due primarily to the fact that these approaches have tried to linearize language and place the decision making process in quantifiable levels, and have limited the processes to the grammatical context of the sentence.

Language can be considered to be a chaotic system with a large number of deep, complex principles which have been developed over a long period of time. In a chaotic system, there are a large number of relationships, each relationship being microscopic in and of itself, but when combined provide an order of some sort in what would outwardly appear to be a randomness. The human mind does not analyze language in the form of a hierarchically based system but, rather, a subset influencing the outcome, i.e., an aggregate of many small "linguistic" principles organized and expressed through the context of the given language.

This application of principles to a given input or stimulus results in the output of the contextual relationships inherent in the input. Although there are certain grammatical and thematic principles or relationships that can be applied to a given sentence structure, providing these relationships is only valid for a very small number of cases when looking at the language wherein the linguistic principles are forced into a hierarchical tree structure would at best only provide limited accuracy to any system that was utilized to analyze language or, for that matter, any chaotic system.

SUMMARY Of THE INVENTION

A theme parsing system determines the thematic context of input discourse. All words in a text have varying degrees of importance in the text, some carrying grammatical information, and others carrying the meaning and content of the text. Additionally, each word carries thematic information that conveys the importance of the meaning and content of the text. The theme parsing system discriminates words and phrases of the input discourse, identifying the type of importance or meaning, the impact on different parts of the discourse, and the overall contribution to the content of the discourse. The thematic context of the discourse is determined in accordance with theme assessment criteria that is a function of the strategic importance of the discriminated words.

In one embodiment, the thematic assessment criteria is utilized to define which of the discriminated words are to be selected for topic extraction, content attraction, or kernel sentence generation. The discourse is then output in a predetermined thematic format as a different view to a user, giving the topics of the discourse in a topic extractor, generating summarized versions of the discourse in a kernel generator, and identifying the key content of the discourse in a content extractor.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

SYSTEM OVERVIEW

Figure 1:
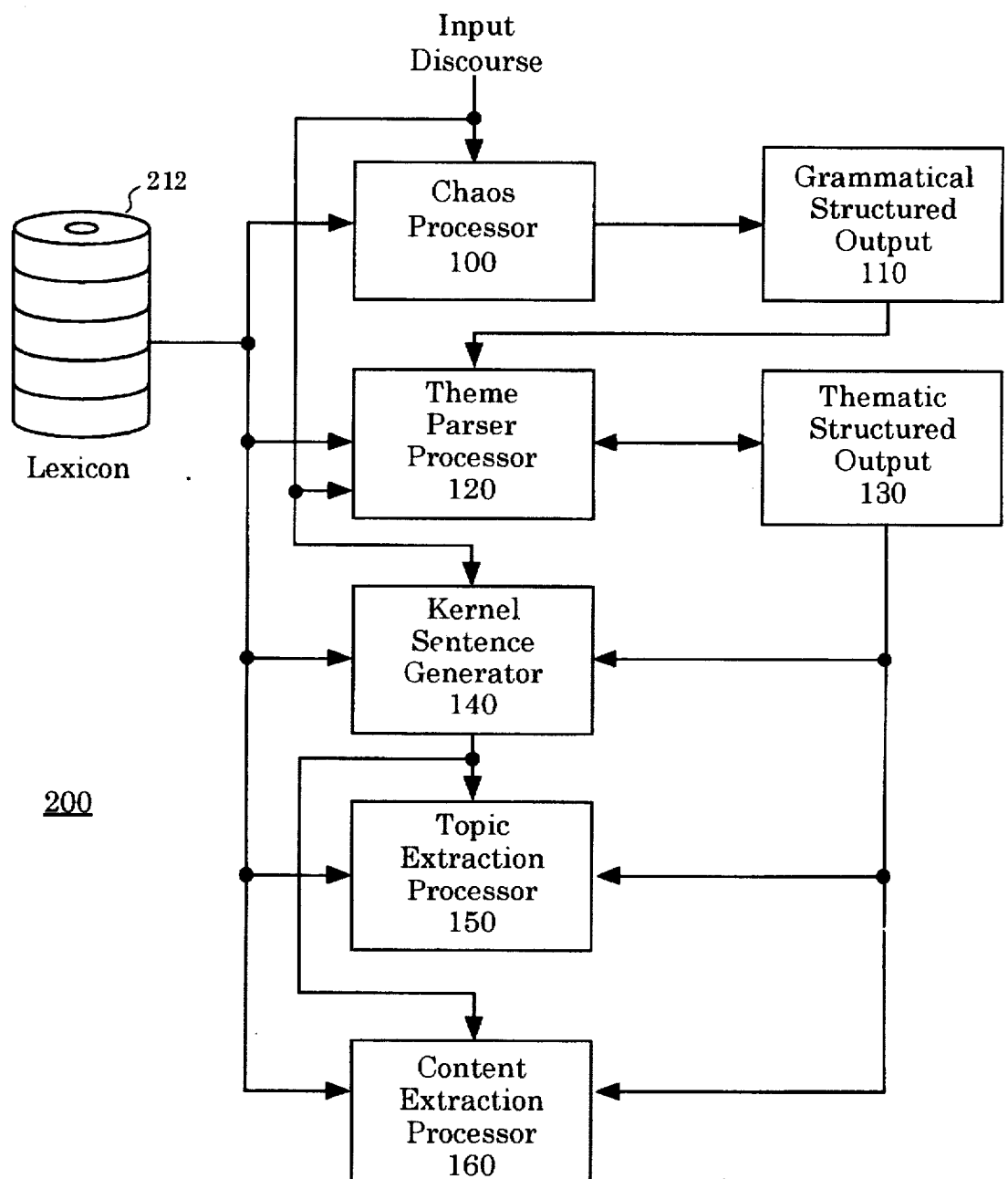
FIG. 1 is a block diagram illustrating the theme parsing system.

FIG. 1 is a block diagram illustrating the theme parsing system of the present invention. A theme parsing system 200 contains a theme parser processor 120, a kernel sentence generator 140, a topic extraction processor 150, a content extraction processor 160, and a lexicon 212. In general, the theme parser processor 120 receives input discourse, and generates a thematic context output 130 through use of the lexicon 212 and a grammatical structured output 110. The input discourse may be in the form of textual input, or may be in the form of speak converted to textual input. As is explained fully below, the thematic context output 130 indicates the applicability of thematic constructions to words and phrases of the input discourse to provide a thematic profile of the input discourse. In general, the lexicon 212 contains definitional characteristics for a plurality of words and terms. For example, the lexicon 212 defines whether a particular word is a noun, a verb, an adjective, etc. Appendix A, entitled "Lexicon Documentation", provides a description of the definitional characteristics in accordance with one embodiment.

Figure 5:
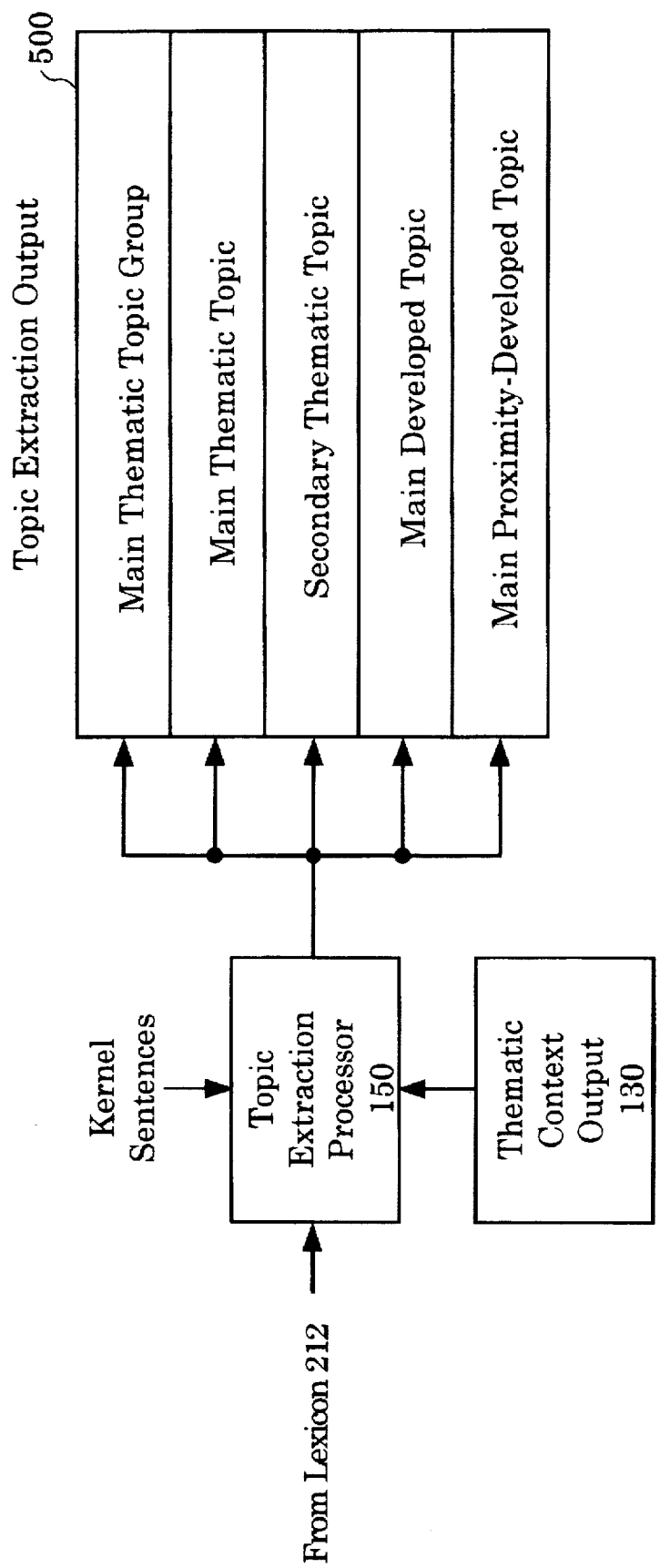
FIG. 5 is a block diagram illustrating the operational flow of the topic extraction processor.
Figure 6:
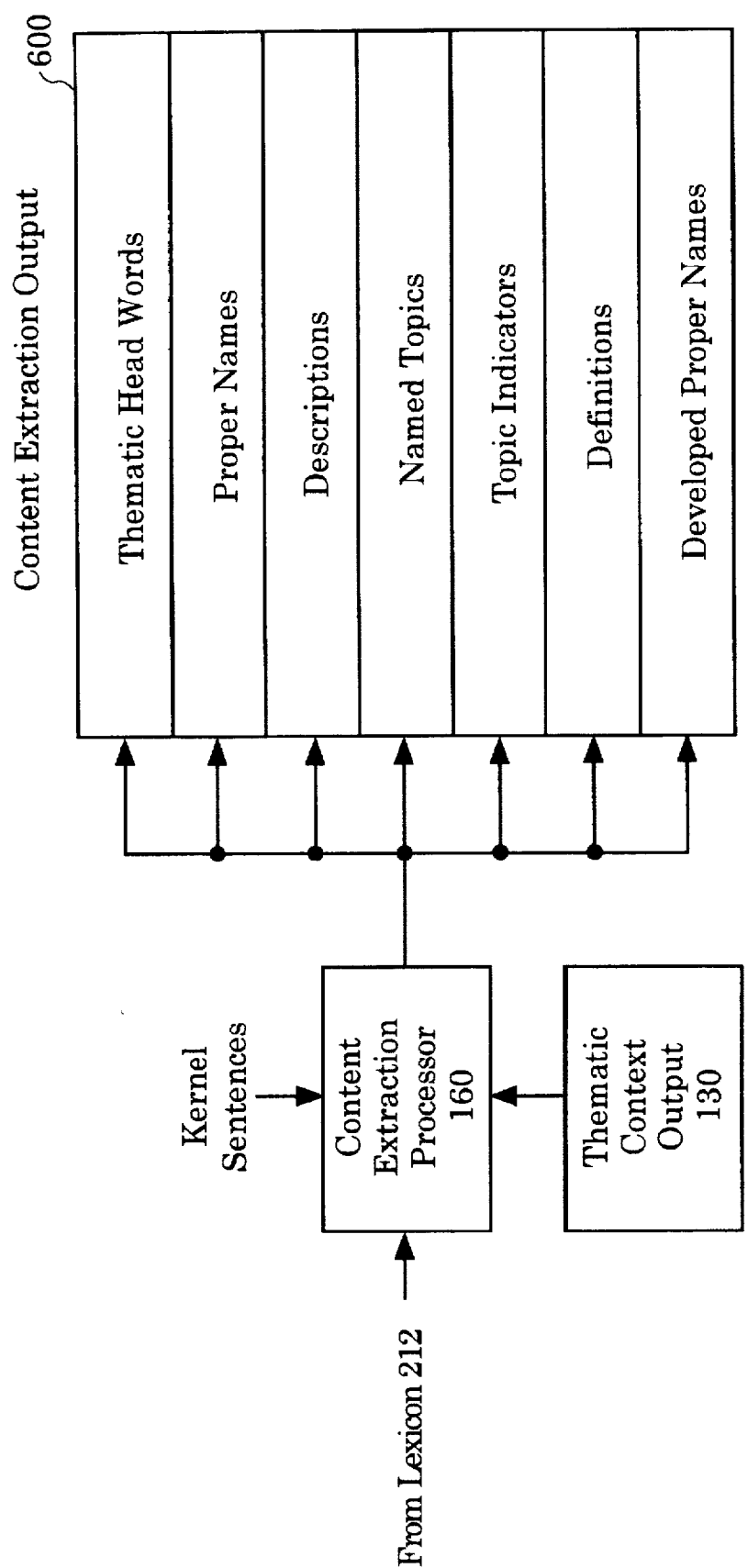
FIG. 6 is a block diagram illustrating the operational flow of content extraction processing.

The kernel sentence generator 140, the topic extraction processor 150, and the content extraction processor 160 utilize the thematic assessments in the thematic context output 130 to further identify the thematic content of the input discourse. The kernel sentence generator 140 develops, for each sentence in the input discourse, shorten sentences that contain only the essential content carrying words that convey meaning. The topic extraction processor 150 locates the main topic in sentence, extracts its supporting context, and places the result in a topic extraction output (FIG. 5). The content extraction processor 160 identifies certain major thematic points in a sentence, and places these in a content extraction output (FIG. 6).

The theme parsing system 200 may be implemented in either hardware or software. For the software implementation, the theme parsing system is software that includes a plurality of computer executable instructions for implementation on a general purpose computer system. Prior to loading into a general purpose computer system, the theme parsing system software may reside as encoded information on a computer readable medium, such as a magnetic floppy disk, magnetic tape, and compact disc read only memory (CD-ROM). In one hardware implementation, the theme parser processor 120, kernel sentence generator 140, topic extraction processor 150, and content extraction processor 160 may each comprise dedicated processors including processor instructions for performing the functions described herein. Circuits may also be developed to perform the functions described herein. The lexicon 212 may be implemented as a database stored in memory for use by the theme parsing system 200.

The input to the theme parsing system 200 is a grammatical structured output 110. However, for purposes of explanation, FIG. 1 also shows a chaos processor 100. The chaos processor 100 receives, as an input, the input discourse, and generates the grammatical structured output 110. In a preferred embodiment, the grammatical structured output 110 includes information to characterize the contextual aspects of the input discourse including the grammatical, stylistic and base thematic aspects. Appendix B, entitled "Chaos Processor for Text", describes one embodiment for generating the grammatical structured output for use with the theme parsing system. Although the theme parsing system is described in conjunction with the chaos processor described in Appendix B, any process that generates an output to define contextual aspects of discourse may be used without deviating from the spirit and scope of the invention.

In general, the chaos processor 100 identifies, for words and phrases in the input discourse, grammatical aspects of the input discourse including identifying the various parts of speech. All words in a discourse have varying degrees of importance in the discourse, some carrying grammatical information, and others carrying the meaning and content of the discourse. The chaos processor 100 ascertains how the words, clauses and phrases in a sentence relate to each other. By identifying the various parts of speech for words, clauses, and phrases for each sentence in the input discourse, the context of the input discourse is defined. The chaos processor 100 stores information in the form of grammatical or contextual tags. For a detailed explanation of the grammatical structured output 110 for use with the theme parsing system of the present invention, see Appendix C, entitled "Analysis Documentation." Although the theme parsing system is described in conjunction with the grammatical structured output described in Appendix C, any grammatical structured output that defines contextual aspects of discourse may be used without deviating from the spirit and scope of the invention.

THEME PARSER

After the grammatical context, the base thematic context, and the style have been ascertained and stored in the grammatical structured output 110, the full thematic parse can be implemented. The grammatical context is needed in order to establish the grammatical relationships that exist in a sentence. The style assessments are needed in order to establish the general tone and writing methods used by the author, and the base thematic context is the initial thematic analysis that makes simple decisions about the basic components of the theme when using only the grammatical context for clues. In addition to these contextually calculated aspects of a sentence, additional lexical information that is attached to each word stored in the lexicon 212 is used.

Figure 2:
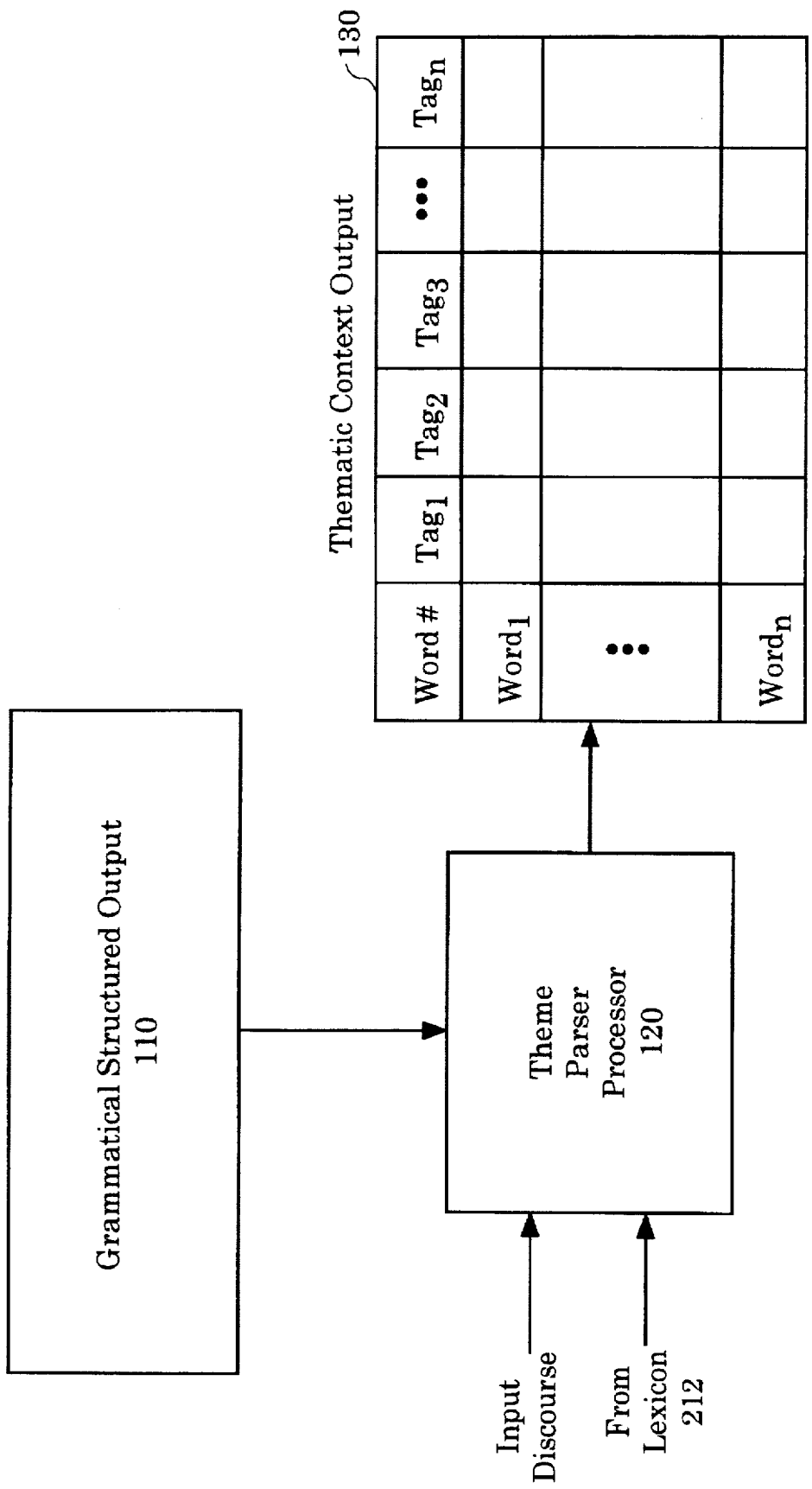
FIG. 2 is a block diagram illustrating operational flow for the theme parser processor.

The full thematic context output 130 of the document is now produced by checking each word against all possible thematic constructions, and recording either the existence or non-existence of each thematic aspect, or a scale of how much of a thematic aspect each word carries, or what specific sub-classification of a general thematic aspect the word contains. Each word in a sentence is then subjected to a series of tests to determine and record its thematic aspects. FIG. 2 is a block diagram illustrating operational flow for the theme parser processor 120. As shown in FIG. 2, the thematic context output 130 contains a plurality of words and phrases contained in a particular input discourse. The existence or non-existence of each thematic aspect is indicated by a plurality of thematic tags. For example, if a first word/phrase contained the existence of the first thematic construction, then the corresponding $tag_1$ field is set accordingly.

As the detail for the thematic parser is discussed, certain examples will be used to indicate why a particular assessment is useful. Many of these examples will be based on the ability to generate a new, summarized version of a sentence. This assumes that any sentence contains a certain amount of information that can be removed without removing the main 'gist' of the sentence. An example of this would be:
Each word in a sentence is then subjected to a series of tests.
Each word subjected to series of tests.
Each word subjected to tests.
Word subjected to tests.

The subsequent sentences can progressively paraphrase the first, full version. While not fully grammatical, they can be read correctly and easily, without misinterpretation. A common example that will be used in any discussion of weak/strong words will be the ability to readily remove parts of a linguistic constituent group without rendering the sentence unintelligible.

Default Setup

Figure 3:
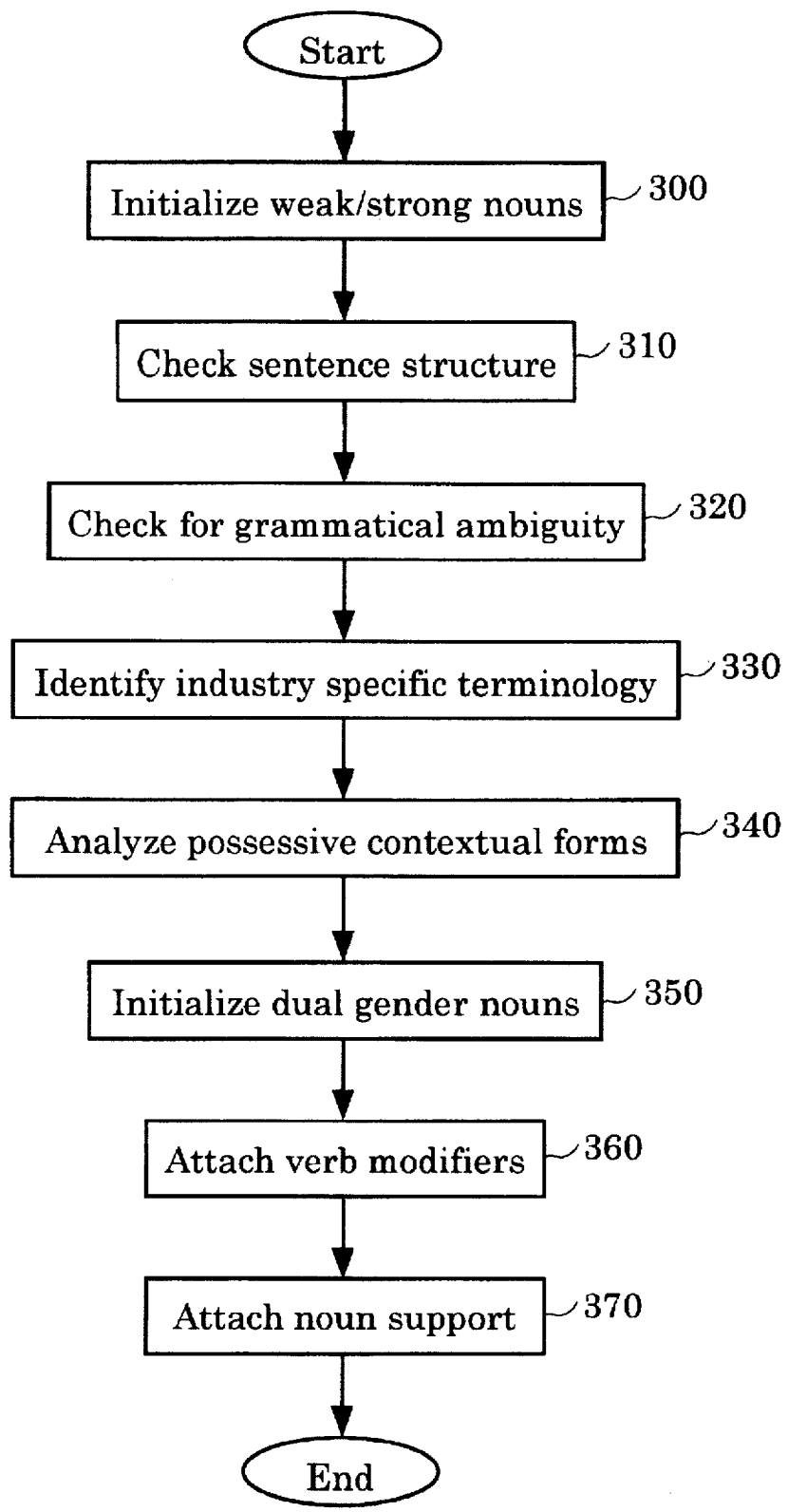
FIG. 3 is a flow diagram illustrating default setup operations for theme parsing processing.

FIG. 3 is a flow diagram illustrating default setup operations for theme parsing processing. Eight default setup operations are performed before the full thematic parsing can commence:

1. Weak/Strong Noun Initialization
2. Sentence Structure Checking
3. Grammatical Ambiguity Analysis
4. Industry-Specific Terminology Identification
5. Possessive Contextual Form Analysis
6. Dual Gender Noun Initialization
7. Verb Modification Attachment
8. Noun Support Attachment The first processing step sets the default conditions of each thematic aspect of each word to a zero condition (does not contain this thematic aspect).

Weak/Strong Noun Initialization

As shown in block 300 in FIG. 3, weak/strong characterizations are specified for nouns. A default condition is placed on each noun in the sentence. Each noun carries a thematic aspect recording the strength of the noun. 'Weak' and 'strong' refer to the strength of the word's content-carrying sense. Some nouns are very descriptive when used in isolation, while others are very vague. 'Windmill' is very specific, but 'place' is very vague, and needs some additional information to help define the type of 'place' to which the author is referring. A noun can be encoded in the lexicon as 'strong' or 'weak', or can be computed in the thematic analysis as 'strong' or 'weak'. But each noun initially starts in its thematic processing by assuming it is 'strong'.

The strong/weak labels are referring only to the noun in isolation. A noun that is 'weak' in isolation can still be 'strong' as a unit, as long as it has some strong supporting words, such as adjectives or prepositional phrases. And there can be a number of levels of supporting prepositional phrases. But as long as one of the nouns in one of the prepositional phrases that modifies a particular noun can be classified as 'strong', the whole chain from that point up to the originating noun head can be classified as strong because of this strong support.

There are four conditions that must be thought of together when ascertaining a noun's content value.

1. A noun can be weak, with no support.
2. A noun can be weak with strong support.
3. A noun can be strong with weak support.
4. A noun can be strong with strong support.

Each noun is coded with a thematic aspect tag indicating whether it has supporting content, in the form of strong modifying adjectives or strong postposed prepositional phrases. A noun's initial default condition assumes it does not have strong supporting content.

Basic thematic analysis is highly concerned with the content-strength of words, especially nouns and adjectives. Nouns are the most focal part of a sentence, and can be thought of as carrying a certain amount of content in them. Some nouns are very rich in content and need no additional supporting information to be complete. A word such as 'sonar' is very strong in its content-senses. But words such as 'list' are very weak, and do not convey much information in isolation. Instead they look for other supporting information to help deliver the content of the noun phrase.

'Employee list' or 'list of employees' uses a stronger content word, such as 'employee,' to complete the full content-representation of the word 'list'. Eventually, one aspect of thematic analysis will determine if a noun phrase group (a noun plus its adjectives and supporting prepositional phrases) must be kept intact in order to convey its content properly, or if parts of the phrase can be removed without altering the basic meaning. An example would be 'electric guitar'. 'Electric' conveys additional information about 'guitar', but 'guitar' on its own still provides the basic thematic content. So 'electric' could be removed, which would remove some descriptive detail from the sentence, but would not diminish the basic understanding of the sentence. However, removing 'employee' from 'employee list' would remove the basic content-carrying word, leaving only an empty shell. This would seriously detriment the understanding of the sentence.

Each assessment of theme must understand the gradient levels of content in a sentence, where they exist, and where and when they could be removed without excessive problems. This will be discussed in detail later. But there are some default operations that are performed initially on a word that override certain types of strong/weak analyses.

Sentence Structure Checking

The sentence as a whole is checked for the existence of at least one predicate as shown in block 310 in FIG. 3. If the sentence does not contain a single predicate, it is assumed to be a heading or part of a sentence that cannot be analyzed for thematic content. The entire sentence is therefore marked for removal from the thematic processing routines.

Grammatical Ambiguity Analysis

Each word in the sentence is checked for any grammatical ambiguity as shown in block 320 in FIG. 3. One such condition occurs when the grammar parser cannot assign any parts of speech to a word. In this case, if the word is in a noun phrase, it is defaulted to an adjective. If the word is not in a noun phrase, it is defaulted to a noun. This causes naturally ambiguous grammatical conditions to be focused on more heavily by the thematic routines (since nouns and noun phrases are the most content-rich parts of thematic analysis).

Industry-Specific Terminology Identification

Additional default conditions are based on the existence of certain pieces of lexical information for a word. One such default is based on the use of special industry-specific terminology as shown in block 330 in FIG. 3. Any word that is marked in the lexicon as 'industry oriented' should keep its supporting information, even if the word is deemed to be strong. For example, the word 'yield' may be marked as an important industry-specific term in banking. This would cause phrases such as 'yield on certificates of deposit' to remain together as a complete content unit, when otherwise it may have been logical to think that 'yield' could stand alone. In this case, a default test sets the industry-specific word to 'weak' whenever it has strong supporting information. This helps any application interested in reducing the content of the sentence to keep the supporting terms attached to the head term.

Possessive Contextual Form Analysis

As shown in block 340, default setup includes analysis of possessive contextual forms. Another default condition arises with the use of strong head nouns with strong, postposed, supporting terms in a possessive-style prepositional phrase. For example, in 'the theft of automobiles', 'theft' could be thought of as being 'strong', but 'of automobiles' is a strong indicator of content and usually needs to be kept associated with the head word. Head words in this context are by default marked as 'weak', but with strong supporting information. They are also marked with a special strong-content code that specifically identifies the head word as conveying strong content, but wants the supporting words to be kept associated with the head word. This helps applications that summarize text to keep the phrase together, but also indicates to content-abstraction applications that the head term conveys strong content in isolation.

Dual Gender Noun Initialization

Another default condition, which is entitled dual gender noun initialization, sets the strength of certain dual-gender nouns to 'weak' as shown in block 350 in FIG. 3. If a word is marked as dual-gender, if it has no additional strong supporting context, if it is not in the simple subject position of a clause, and if it is not in a prepositional phrase, then the word is marked as 'weak.' An example is 'They allow manufacturers to offer large discounts'. 'Manufacturers' is marked as 'weak' in this particular context.

Verb Modification Attachment

As shown in block 360 in FIG. 3, default setup further includes verb modification attachment. This thematic aspect concerns itself with the attachment of additional modifying information to verbs. Some verbs require additional adverbial information in order to be fully understood. This additional information could be available in the form of an adverb, an adverbial prepositional phrase, or an adverbial clause. Other verbs accept this additional information when available, and specifically look for it, but can still function properly without it. And still other verbs do not care if it is included or not. These verbs are specifically marked in the lexicon as 'obligatory-adverb required' and 'optional-adverb acceptable'.

The verb 'put' is an example of an obligatory-adverb verb. A sentence such as 'He put the book.' leaves us naturally wanting to know where the book was placed, such as 'on the desk'. But other verbs with the same grammatical context do not convey the same experience. 'He read the book.' does not cause the reader to be looking for additional information modifying 'read', such as 'in a chair' or 'at the office'.

As with the 'weak' and 'strong' nouns, applications that look to summarizing these sentences must be aware of the information that can be easily removed, and the information that causes problems for the reader when it is removed.

In our initial default analysis, before the full thematic assessments begin, several conditions naturally cause verbs to be defaulted to an 'obligatory' or 'optional' condition. Any monotransitive verb that does not have a direct object but that does have an adverbial phrase is coded by default as an obligatory-adverb verb. This causes the adverbial phrase to be retained longer, as would an object to the verb.

Intransitive verbs should have the obligatory-adverb setting, causing any adverbial phrases to be linked more directly to the verb. And verbs that signal 'unmarked' infinitive clauses are marked as optional-adverbial, causing the infinitive clause to be carried with the verb. An example of this type of sentence is 'Bob had three people guard the door.' 'Had' signals the allowance of the unmarked infinitive 'guard'. This sentence would feel very incomplete if this clause were removed when a summary of the sentence is generated.

Finally, ditransitive verbs with only one object set the optional-adverb flag to indicate that any adverbial information be strongly attached to the verb, filling in for the missing object.

Noun Support Attachment

As a last stage in the pre-processing theme section, each word is analyzed to determine if strong support exists for it as shown in block 370 in FIG. 3. The strong support assessment will be used along with the strong/weak noun thematic assessments to determine if the word is a focal point for a strong point as a whole.

MAIN THEMATIC ASSESSMENTS

After the initial setup routines are complete, each word is processed through the main thematic assessment routines. These routines attach flags to each word/phrase in the thematic context output 130 that indicates its thematic character. Each theme routine will have a short explanation, examples where needed, and sample abstract syntactic representations that indicate the abstract nature of the sentence context that is necessary for the routine.

The thematic assessments are a series of tests made against each word/phrase in the exact context of the sentence. Each test records the existence or degree of applicability of each of the theme routines to the word/phrase. The collection of the grammar, style, base theme, and these thematic assessments together will provide the necessary information that applications need to re-write sentences and extract group of content.

There are three main types of thematic assessments:
  Major Thematic Assessments
  Theme-Relational Tagging
  Theme-Location Identification
  Major Thematic Assessments Major thematic assessments contain all of the routines necessary to make major assessments about the overall theme of the sentence. There are 210 such routines, each of which produces an output to be stored for each word/phrase in the thematic context output.

AddAdv: Identifies 'additive adverbs' functioning in an adverbial role. Additive adverbs indicate that the predication is additionally true about the referent under focus. Based on the exact context of the sentence, this flag is set when an additive adverb is not essential to the meaning. The adverb may occur in any contextual position in the sentence.

ex: Mary also could play the banjo.
  The banjo similarly has the dynamic range of a chainsaw.

AdjAdvSubordination: Identifies adjectival and adverbial clauses that are not essential to the meaning or to the grammatical integrity of the sentence. Most non-contrastive type sentence level adverbial clauses are tagged, and most adjectival clauses that modify strong nouns are tagged. If the adjectival clause carries strong content information and the noun it modifies is weak, then the clause is not tagged. Adjectival clauses that have no strong elements are tagged even if the noun being modified is weak and needs support.

ex: After they had voted, the race was run on Sunday.
  The main idea that he had was never implemented.

AdjDeterminer_b: Identifies determiners that modify plural count nouns or mass nouns, and that are not essential to the meaning or to the grammatical integrity of the sentence. They must be used as a determiner in the context of the sentence.

ex: I don't have enough strength to lift the box.

AdjectiveNotDet: Identifies adjectives that are not determiners, and that are not essential to the meaning. The adjective must occur in a noun phrase, and be marked as a weak adjective in the lexicon.

ex: A large cat jumped off the roof.

AdjectivalClause: Identifies adjectival clauses that are not essential to the meaning. If the adjectival clause carries strong content information and the noun it modifies is weak, then the clause is not tagged. If the clause contains no strong information, then it is tagged, even when the noun being modified is weak.

ex: The main idea that he had was never implemented.

AdjectivalPrepPhrase: Identifies adjectival prepositional phrases that are not necessary to the meaning. If the noun being modified by the prepositional phrase is weak and the prepositional phrase carries strong content, the phrase is not tagged. If the prepositional phrase contains no strong information, it is tagged, even if the noun it modifies is weak.

ex: My physics book with the torn pages was lost.

AdjSubjComp: Identifies adjectives functioning as subject complements that are not essential to the grammatical integrity of the sentence. These adjectives will be marked as weak in the lexicon.

ex: The box was large.

Adverbs: Identifies adjunctive adverbs that are not essential to the meaning or to the grammatical integrity of the sentence. The adverb may appear in any position in the sentence, and may modify any valid constituent.

ex: The bear quickly ran into the forest.

AdverbAfterVerb: Identifies adverbs (usualby adjuncts) directly following verbs where the adverb is not essential to the meaning. It is essential only when the verb it modifies is marked in the lexicon as an obligatory or optional adverb-type verb.

ex: The bear ran quickly into the forest.

AdverbEndMc: Identifies adverbs (usually adjuncts) ending a main clause where the adverb is not essential to the meaning (when the verb in its clause is not an obligatory or optional adverb type verb).

ex: The bear ran into the forest quickly.

AdverbialNpInit: Identifies introductory noun phrases of time. The noun phrase may occur at the start of any main clause, must have a time noun as its head, and must be only a noun phrase, not a prepositional phrase or any other constituent.

ex: Early that morning, we set off for camp.

AdverbInit: Identifies adverbs (usually disjunctive) that start a main clause where the adverb is not essential to the meaning. It is essential to the meaning only when marked in the lexicon as an orienter, such as the words 'economically' or 'linguistically' which name industries or specific fields of study.

ex: Actually, they left for the store.

AdvClauseInit: Identifies adverbial clauses at the beginning of a main clause that are not necessary to the meaning. Only those clauses that contrast to the information in the main clause will not be tagged.

ex: After they had voted, the race was run on Sunday.

AdvInNp: Identifies adverbs in noun phrases that are not essential to the grammatical integrity of the sentence. This includes any adverb but those marked as orienters.

ex: It was an unusually comical movie.

AdverbSplitInfin: Identifies adverbs in split infinitives.

ex: . . . to boldly go where . . .

AdverbialBetweenCommas: Identifies adverbial phrases set off by commas, which are not essential to the meaning or to the grammatical integrity of the sentence. This includes all adverbials that are not orienters.

ex: The bear was, at least partially, standing on its hind legs.

AdverbialClause: Identifies adverbial clauses that are not necessary to the meaning. These include most non-contrastive adverbials.

ex: When the right times comes, I am going to learn to fly a plane.

AgoAdverbial: Identifies time representations that end in 'ago' or similar words, which are not necessary to the grammatical integrity of the sentence.

ex: I took the test some years ago.

Appositive: Identifies all appositives in any context.

ex: Bob Smith, a market analyst, said . . .

ApproxPrep: Identifies 'approximator prepositions' such as 'around, about, close to' where the prepositional phrase is not essential to the meaning. The phrase will be necessary only when it modifies a verb marked as obligatory or optional adverbial, or when the prepositional phrase contains strong content and the noun it modifies is weak.

ex: Bob left the party around ten o'clock.

Article: Identifies articles (determiner type).

ex: The bear ran down the road.

AttitudeAdv: Identifies 'attitudinal adverbs' functioning in an adverbial role where the adverb is not essential to the meaning.

BeVerb: Identifies all forms of the 'be' verb in certain contextual positions where the sense of the clause can be understood without the 'be' verb.

ex: The student is taking too many courses.

BeVp: Identifies the entire non-lexical section of a verb phrase that involves a 'be' verb, where the verb phrase section is not essential to the meaning or to the grammatical integrity of the sentence.

ex: Doug must be willing to invest in the future.

BogusSubject: Identifies subjects that carry no content.

The level increased because the knob kept moving forward.

CommentInit: Identifies initial sentence comments that are not marked as orienters.

ex: Pound for pound, Bill Bates is the hardest hitter in the league.

ComparativeInSubjComp: Identifies comparatives in subject complements that are not essential to the meaning or to the grammatical integrity of the sentence.

ex: These cars are faster than mine.

ComparativeInSubject: Identifies comparative expressions in the subject that are not essential because they do not contain significant content.

ex: The faster planes will leave last.

Compromiser: Identifies 'compromiser adverbs' that are not essential to the meaning, where the conjunction is not essential to the meaning or to the grammatical integrity of the sentence.

ex: Men both young and old were invited.

ConcessiveAdv: Identifies 'concessive adverbs' that are not orienters.

ConjInNp: Identifies conjunctive and adjunctive adverbs that start main clauses and which are not orienters.

ex: Additionally, we may have to spend more money.

CorrelConj: Identifies 'correlative conjunctions' with following prepositional phrases.

CryptoAdjClause: Identifies clauses that syntactically appear adjectival but grammatically function adverbially.

ex: It came from the French, which also . . .

CryptoAdv: Identifies syntactic adverbs that are not necessary to the meaning.

CryptoClause: Identifies clauses of any type that appear syntactically isolated. Identifies a syntactic subject that is grammatically an adverbial.

ex: Actually, a few days prior to the interview, they had . . .

CryptoPrepPhrase: Identifies prepositional phrases of time that are not part of verbs that are marked as obligatory or optional adverbials.

ex: We met on that day.

DemonsAdj: Identifies 'demonstrative adjectives' that do not carry strong content (marked weak in the lexicon).

DemonsSubjBe: Identifies 'demonstrative pronouns' that are the grammatical subject of 'be' verbs.

DemonstrativeModifier: Identifies demonstrative adjectives that do not carry strong content (marked weak in the lexicon).

DemonstrativeSubject: Identifies demonstrative pronoun subjects that are not necessary to the grammatical integrity of the sentence.

Determiner_d: Identifies determiners that modify only plural count nouns, and that are not essential to the meaning.

DoVerb: Identifies the 'do' verbs that are not negated and that are not essential to the meaning.

ex: The students did understand the lesson.

ElliptedPassive: Identifies ellipted passives clauses that are not essential to the meaning.

ex: The language supports several color spaces based on this standard.

EmptyVerb: Identifies verbs with an empty meaning, such as 'try, begin, ought', that are not essential to the meaning.

ex: He tries to maintain a good balance.

ExtractTopicWord: Returns the actual word from the initial sentence that represents the topic of the sentence.

Factive: Identifies 'noun particles' that are measurements, such as 'gallon, piece, few' that are not essential to the meaning.

ex: He added several gallons of water.

FinalPrep: Identifies prepositions that occur at the end of the sentence.

FindTopic: Identifies the main thematic topic in the sentence.

ex: A list of employees was printed.

The judge ruled that they were innocent.

FocusAdv: Identifies 'focusing adverbs' that are not orienting words.

HaveAux: Identifies the 'have' verb where it is not essential to the meaning or to the grammatical integrity of the sentence.

ex: The students have learned their lesson.

HaveTo: Identifies the phrasal forms of 'have+to' when functioning as a full lexical verb. This sequence would be replaceable by single words, such as 'must'.

ex: We have to leave soon.

HedgingWd: Identifies 'hedging' words, such as 'partially' that do not carry strong content.

ex: He was partially finished with the job.

HedgingVerb: Identifies hedging verbs whose subject is plural with a following infinitive.

InfinClauseAfterObj: Identifies infinitive clauses that follow direct objects. The clause if tagged if it contains no strong elements.

ex: We completed all the forms to get a passport.

InfinInfin: Identifies a series of two infinitive phrases where the first is not necessary to the meaning or to the grammatical integrity of the sentence.

ex: We needed to finish to get our diploma.

IsAdjOrAdvClause: Identifies the given word as part of any adverbial or adjectival subordinate clause.

IsAnotherFocus: Returns TRUE when another main focus occurs in the current predicate after the given word location.

IsAnnouncement: Identifies the current verb as a verb of 'announcement'.

ex: We announced that the acquisition was called off.

IsAdjAdvClauseAnywhere: Identifies that the given word is contained in an adverbial or adjectival subordinate clause at ANY level of subordination.

IsAntecedantPrnSubj: Identifies the given pronoun subject as having an antecedent in the current sentence.
ex: Bob said that he would be there later.

IsAsBlankAs: Identifies the given word as part of an 'as WORD as' sequence.
ex: He is as clever as a fox.

IsAuxVerb: Identifies the given word as an auxiliary verb.
ex: He can see the painting.

IsBackRefCompoundNp: Identifies the given conjunction as part of a noun phrase compound where the second element is referring back to previous information.

IsBeComplement: Identifies the given word as a topic in a subject complement.

IsBeEquate: Identifies the given word as a 'be' verb for a coordinated topic.

IsBogusMc: Identifies the given word as an appositive that is syntactically marked as a main clause.
ex: He pleaded guilty to embezzeling from a bank, and to tax evasion, acts committed before he was married.

IsBogusSubject: Identifies the given word as a gerund syntactically marked as a subject.
ex: An exercise machine employing this cam enables the user to produce remarkable growth in strength and muscle size.

IsCompAppositive: Identifies the given word as an appositive that is properly ended.
ex: Bob Smith, a market analyst, said...

IsComplexPrep: Identifies the given word as the preposition starting a complex prepositional phrase.

IsCompoundNp: Identifies the given word as part of a compound noun phrase.
ex: Bob caught a tuna and a bass.

IsCryptoNoun: Identifies the given word as an adverb that is syntactically functioning like a noun.

IsDefArtThisNp: Identifies the given word as part of a noun phrase that contains a definite article.
ex: The three bears lived in the woods.

IsDeleteableNounClause: Identifies the given word as part of a noun clause that does not contain strong information.
ex: A general link will find the general area of the document on which the mouse was clicked.

IsDitransNeedPp: Identifies the given word as a prepositional phrase that belongs to a ditransitive verb.
ex: The state declared the land as one of its natural resources.

IsEllipedPassiveClause: Identifies the given word as part of an ellipted passive construction.
ex: These are device independent programs based on the new standard.

IsEndOfClause: Identifies the given word as occurring at the end of any clause structure.
ex: After the game was over, we left for the party.

LsEndOfMc: Identifies the given word as occuring at the end of a main clause.
ex: The bear walked through the woods; Bob never heard it coming.

IsEveryWordToLeftDeleted: Identifies that every word to the left of the given word in the sentence has been marked as non-essential.

IsGoodNounThisPp: Returns TRUE when the given word is in a prepositional phrase that contains a strong or supported noun.

ex: A list of new employees was printed.

IsEmbeddedClause: Identifies the given word as part of a subordinate clause that is embedded in another subordinate clause.
ex: Bob said that the list that was printed was incomplete.

IsImperative: Identifies the given word as an imperative verb.
ex: Write your name on the first line.

IsInNp: Identifies the given word as part of a valid noun phrase.
ex: The bear walked through the woods.

IsInfinitive: Identifies the given word as an infinitive verb.
ex: Bob is going to give me the lamp.

IsInfinitiveClause: Identifies the given word as part of an infinitive clause.
ex: Bob is going to give me the lamp.

IsMainVerb: Identifies the given word as the main lexical verb of a verb phrase.
ex: The ship can usually be identified by its name.

IsModifierSpeechAct: Identifies the given word as a noun that is being modified by a speech act word.
ex: Chapter one is an overview...

IsNeededAdjClause: Identifies that the given word is part of an adjectival clause that IS essential to the sentence. The clause is essential when the noun it modifies is weak and needs support, and then the adjectival clause has strong elements.
ex: The person who rang the bell was never found.

IsNegAdvCl: Identifies the given word as part of a subordinate clause that is being negated (a negative word appears in the clause).
ex: When I couldn't jump the ditch they left me behind.

IsNegVerbThisPred: Identifies the given word as part of a predicate that contains a negative verb.
ex: Bob did not hear the bear.

IsNotPartOfSpeech: Identifies the given word as syntactically ambiguous.

IsNounThisDo: Identifies the given word as part of a direct object with a noun head.
ex: Bob heard the bear in the woods.

IsOkAdj: Identifies the given word as an adjective that carries strong thematic content for supporting a noun.
ex: The economic summit was a success.

IsOkCompHead: Identifies the given word as the head word of a subject complement.

IsOneWordClause: Identifies the given word as a subordinate clause with only one word.
ex: The man accused was very nervous.

IsOnlyPossibleTheme: Identifies the given word as the only strong theme in the sentence.
ex: The bear didn't hear me approaching.

IsSubjectVerbMatch: Identifies that the two given word locations agree in number. This is valid only for simple number tests.
ex: The man with the pictures runs my business.

IsNeededPp: Identifies prepositional phrases that are attached to verbs and that are necessary for the proper thematic completion of the verb.
ex: He put the book on the table.

IsOfPpNeeded: Identifies possessive prepositional phrases that modify weak noun heads, where the prepositional phrase is necessary to the thematic completion of the main noun.

IsOkTheme: Identifies a particular word as being a valid thematic topic. A noun phrase that is strong or that has strong support in its modifying elements.

IsPassiveVbThisPred: Identifies the main verb phrases of the currently pointed to predicate, and returns TRUE when the verb phrase is a passive verb phrase.

ex: We were expected at the office.

IsPassiveVp: Identifies the current word position as being in a passive verb phrase.

ex: We were usually expected at the office.

IsPluralSubjectOfVerb: Identifies the subject of the verb currently being pointed to, and returns TRUE if this subject is plural.

ex: The boys who were at the store jumped into the car.

IsPosAppositive: Identifies the current word being pointed to as being an appositive for the previous noun phrase.

IsPosMainTopic: Identifies the current word being pointed to as being able to function as the main topic of the sentence. It must be strong or have strong support.

IsPrepPhrase: Identifies the current word being pointed to as part of a prepositional phrase.

ex. The rest of the group were hidden in the back of the house.

IsPreviousAs: Identifies when the current word being pointed to is part of an 'as' subordinate clause.

ex: We need to implement the new plan now, as the old plan cannot be completed on time.

IsPreviousComparative: Identifies when the current word being pointed to is part of a comparative phrase in the predicate of the sentence.

IsPrevAuxNeg: Identifies if the current word being pointed to is a verb in a verb phrase that carries a negative modal verb.

ex: He could not usually talk that long.

IsReducedSubClause: Identifies that the current word being pointed to is part of a reduced subordinate clause.

ex: The bear walking in the woods is very noisy.

IsSameBaseClause: Identifies that the two words being pointed to are part of the same base clause.

IsSameClause: Identifies that the two words being pointed to are part of the same clause.

IsSameNounConstituent: Identifies that the two words being pointed to are part of the same noun constituent.

IsSamePp: Identifies that the two words being pointed to are part of the same prepositional phrase.

IsSectionHeading: Identifies the current sentence as being a heading only, not a complete grammatical sentence.

ex: Formatting New Sections

IsStartMc: Identifies the current word being pointed to as the first word of a main clause.

The bear walked through the woods; Bob could not hear it.

IsSubjDeleted: Identifies that the subject for the clause that is being pointed to has been marked as not being essential to the meaning or to the grammatical integrity of the sentence.

ex: The list was not printed using the laser printer.

IsThereMainAction: Identifies that there is a main clause action in the sentence that has not been marked as weak or unnecessary.

ex: The bear walked through the woods.

IsThereMainFocus: Identifies that there is a main focus in the sentence.

ex: The employee master list was printed with a laser printer.

IsThereMainTopic: Identifies that there is a main topic in the sentence.

ex: The list was printed with a laser printer.

IsThereNcTopic: Identifies that the main topic of the sentence is being expressed by a noun clause.

ex: What the speaker said didn't make much sense.

IsTherePrevDo: Identifies that there is a direct object in the current predicate that occurs prior to the current position being pointed to.

ex: We heard the bear walking though the woods.

IsTherePrevPrepFrom: Identifies a prepositional phrase in the same basic thematic unit that is a 'from' type prepositional phrase.

IsThereSupport: Identifies that the current noun being pointed to has strong modifying information.

ex: An economic decision is best.

IsThereWeakTopic: Identifies that the current word being pointed to is a weak, but usable, topic.

ex: The decision was made.

IsTrueAdj: Identifies that the current word being pointed to is a true adjective, not a participle.

ex: The linguistic program at the college was canceled.

IsTrueNp: Identifies that the current word being pointed to is part of a valid noun phrase.

ex: The linguistic program at the college was canceled.

IsThemePh: Identifies that the prepositional phrase being pointed to is part of the main theme of the sentence.

ex: The list of employees was printed on a laser printer.

IsType1Quote: Identifies quoted material with the format—subject +comma+speech act verb+noun phrase+comma+predicate:

ex: But the action, said London finandal analyst Bob Smith, was . . .

IsType2Quote: Identifies quoted material with the format—subject+comma+noun+prepositional phrase+comma+speed act+noun clause:

ex: Bob Smith, president of the company, said that the system . . .

IsType3Quote: Identifies quoted material with the format—main clause with no object+comma+noun phrase+speech act:

ex: The yield dropped substantially, market watchers said.

IsType4Quote: Identifies quoted material with the format—main clause with object+comma+noun phrase+speech act:

ex: Commercial banks will reduce the prime rate, analysts said.

IsType5Quote: Identifies quoted material with the format—subject+verb+to+speec act+noun clause:

ex: He declined to say whether the paper was accepted or not.

IsType6Quote: Identifies quoted material with the format—subject +speech act+comma+quoted clause:

ex: She said, "We will probably buy it."

IsType7Quote: Identifies quoted material with the format—subject+comma+noun+prepositional phrase+comma+speed act+comma+quoted noun clause:

ex: Bob Smith, son of Joe, said, "I don't care."

IsType9Quote: Identifies quoted material with the format—subject+speech act+object+noun clause:

ex: The lady told the customers that they were out of peanuts.

IsType10Quote: Identifies quoted material with the following format:

ex: "I don't care who shot the cat," Josh said.

IsType11Quote: Identifies quoted material with the format—quoted main clause with comma+subject+speech act+comma:

ex: "We can do it," he said, and added that it would be difficult.

IsVerbThisClause: Returns TRUE when there is a lexical verb in the clause pointed to.

IsWeakCompoundNp: Identifies weak compound noun phrases.

ex: The line and the list were not long enough.

IsWeakPp: Identifies that the current word being pointed to is in a weak prepositional phrase.

ex: The name on the list was mine.

IsWhatTense: Returns the verb tense for the word being pointed to. Only 'past' and 'present' are valid.

IsProgressiveVp: Identifies the current word being pointed to as a progressive verb phrase.

IsRepeatTopic: Identifies a particular topic as one that has been established in the discourse recently.

ex: The bear was running through the woods. It stopped at a small pond and started to drink. Then the bear raised its head and started sniffing.

IsTooWeakThemeWord: Identifies a given word as one that is too weak to be a topic of the sentence.

ex: The list was printed on the laser printer.

LowAdverbialClauses: Identifies low priority adverbial clauses that are not necessary to the meaning.

MannerAdverb: Identifies 'manner adverbs' that are not essential to the meaning or to the grammatical integrity of the sentence.

ex: He wrote the letter awkwardly.

McIntroConj: Identifies conjunctions starting main clauses where the conjunction is not essential to the meaning or to the grammatical integrity of the sentence. The conjunction would be replaced with a semicolon.

ex: The soldiers gave a great cheer, for he had won the victory.

Modal: Identifies 'modal auxiliary verbs' that are not essential to the meaning or to the grammatical integrity of the sentence.

ex: We shall arrive on time.

ModDetAdv: Identifies adverbs that modify determiners that are not negative.

MoreAdverbial: Identifies the adverb 'more' in contexts that are not essential to the meaning or to the grammatical integrity of the sentence. This usually indicates additional detail to follow that other theme routines would identify.

ex: Freud contributed more than anyone.

MoreThan: Identifies more . . . than constituents with than functioning as a preposition, with the prepositional phrase not essential to the meaning.

ex: It is more a fish than an animal.

NegativeAdj: Identifies negative adjectives that are not essential to the grammatical integrity of the sentence.

ex: Neither student failed.

NegativePrnSubj: Identifies negative pronoun subjects modified by possessive prepositional phrases.

ex: Neither of the accusations was true.

NeuterProSubj: Identifies 'neuter pronoun subjects' such as 'it, there', that are not essential to the meaning or to the grammatical integrity of the sentence.

ex: It ran into the woods.

NonRestrictiveRel: Identifies syntactic prepositional phrases that are grammatically relative clauses.

ex: Certain buildings such as the RCA building will be destroyed.

NounTimeAdverbial: Identifies noun time adverbials that are not essential to the grammatical integrity of the sentence.

ex: Ed signaled Thursday that he's tired.

ObjectAfterPp: Identifies syntactic direct objects that follow prepositional phrases, which are grammatically appositives or reduced clauses and not essential to the grammatical integrity of the sentence.

ex: The stock closed at 5½, a gain of ⅛.

OfInNp: Identifies the 'of' preposition as head of a prepositional phrase that, along with a weak noun it may modify, is not essential to the meaning or to the grammatical integrity of the sentence.

ex: One of the dogs

OneAdj: Identifies where 'one', when used as an adjective, is not essential to the meaning.

ex: We saw one bear running through the woods.

OnBeforeTime: Identifies where 'on', when used before 'time' words, is not essential to the meaning.

ex: The party was held at the office on Tuesday.

OrphanAdjectivalClause: Identifies adjectival clauses whose noun head modifiers have been identified as not essential to the meaning or to the grammatical structure of the sentence.

OrphanAdv: Identifies adjuncts that are not part of verb phrases or noun phrases.

ex: The simple truth is often not simple at all.

OrphanPp: Identifies prepositions that do not have following noun phrases.

PersonalRef: Identifies personal references.

ex: I would expect other banks to follow suit.

PossProObj: Identifies possessive pronouns in prepositional phrases or objects, where the pronoun is not essential to the meaning or to the grammatical integrity of the sentence.

PossProSubj: Identifies possessive pronouns in subjects, where the pronoun is not essential to the meaning.

PreDetNp: Identifies 'predeterminers' such as 'just' that are not essential to the meaning.

ex: Bob thought that just three files were missing.

PrepPhrases: Identifies prepositional phrases that are not essential to the meaning or to the grammatical integrity of the sentence.

PrepPrep: Identifies a preposition followed by another preposition where the second preposition is not essential to the meaning or to the grammatical integrity of the sentence.

ex: The cat is by the heater in the kitchen.

PronounSubjPassive: Identifies 3rd person pronoun subjects with passive verb phrases.

ex: She was sent to the store by Bob.

PseudoMcBreak: Identifies 'in that' clauses where 'in that' could be replaced by punctuation.

ex: We agreed with Bob, in that he was the expert.

PureCoordConj: Identifies 'pure coordinating conjunctions' that could be replaced by commas or other punctuation.

Bob saw the bear, and the bear ran away.

QuoteSource: Identifies the quoted source of statements. Refer to the individual IsQuote . . . theme routines for detail.

ReflexivePrn: Identifies 'reflexive pronouns' that are not essential to the meaning or to the grammatical integrity of the sentence.

RelThat: Identifies 'relative pronouns' that introduce relative clauses, where the pronoun is not essential to the grammatical integrity of the sentence.

SaveTopic: Identifies every word in the sentence that is not part of the main topic.

ex: The bear ran through the woods.

Semicolons: Identifies main clause boundaries where conjunctions could be replaced with punctuation.

ex: The bear ran through the woods, and Bob ran home.

StrandedInfinClause: Identifies syntactic infinitive clauses that are not essential to the meaning or to the grammatical integrity of the sentence.

StrandedNounClause: Identifies noun clauses that are not essential to the meaning or to the grammatical integrity of the sentence.

StrandedNounPhrase: Identifies temporal noun phrases that are not essential to the meaning or to the grammatical integrity of the sentence.

ex: The tiger at the circus performs twice a day.

StrayAdj: Identifies adjectives not in noun phrases or subject complements.

StrayAdverbial: Identifies adverbials that are not in traditional grammatical locations.

SubjAdvVerb: Identifies adverbs positioned between the subject and verb of a clause, where the adverb is not an orienter.

ex: Bob quickly ran away from the bear.

SubjectSplice: Identifies subordinate clause subjects that are acting as the subject of the main clause.

ex: As the term is used again in the same section of text, it loses importance.

SweepNpTrash: Identifies noun phrases that appear stranded after the surrounding context has been identified as non essential.

ThanPrepPhrase: Identifies prepositional phrases beginning with 'than' that are not essential to the meaning.

ex: It is more a fish than an animal.

ThatClauseAdj: Identifies adjectives in 'that' clauses with weak verbs, where the entire clause is not essential to the meaning or to the grammatical integrity of the sentence.

ex: Be aware that similar products often come with different labels.

TimeAdj: Identifies 'adjectives or adverbs of time' that are not essential to the meaning.

ex: Bob walked to the store daily.

TimeAdvInVp: Identifies time adverbs in verb phrases.

ex: Bob walked daily to the store.

TimeInObject: Identifies time noun phrases in objects.

ex: Bob went to Rome each Christmas.

TimeInSubjNp: Identifies time noun phrases in the subject of the sentence.

ex: Every Thursday is a hard day for Bob.

TimeSubject: Identifies simple time subjects, with following subject modifiers, where the time subject can be replaced with the following modifiers.

ex:

TimeTime: Identifies time words that follow other time words, where the second time word is not essential to the meaning.

ToInfinitive: Identifies infinitives marked by 'to' where the 'to' is not essential to the grammatical integrity of the sentence.

ToneAdv: Identifies 'tone adverbs' indicated as 'maximizers, emphasizers or diminishers' that are not essential to the meaning.

TopicalizerPhrase: Identifies topicalizers modifying before possessive prepositional phrases where the topicalizer and the following preposition are not necessary to the meaning or to the grammatical integrity of the sentence.

TopicalClause: Identifies introductions to topical clauses.

ex: It is dynamic in that it can provide feedback.

Transition: Identifies 'transition words' that do not indicate 'time' or 'coordination', and that are not essential to the meaning or to the grammatical integrity of the sentence.

TrashBogusMc: Identifies clauses begun with semicolons where there is not a full main clause and where the clause is not essential to the meaning or to the grammatical integrity of the sentence.

TrashMc: Identifies main clauses that have all of their major elements marked as non-essential to the meaning and to the grammatical integrity of the sentence, where the entire main clause is actually unnecessary.

TrashStraySubj: Identifies subjects that have become unattached because of insufficient strong information in the rest of the clause.

TrashWholeSent: Identifies entire sentences that don't have any strong thematic content.

UniversalPrn: Identifies 'universal pronouns', 'predeterminers' or 'cardinal determiners' that are not essential to the meaning or to the grammatical integrity of the sentence.

UselessAdj: Identifies weak adjectives in noun phrases.

ex: The late president planted that tree.

UselessPrepPhrase: Identifies meaningless prepositional phrases.

ex: There is a viable alternative to it.

UselessPrnObj: Identifies indirect object pronouns.

ex: Congress gave them the shaft.

UselessPrnSubj: Identifies pronoun subjects that have alternate subject contexts that carry the meaning.

ex: No one except his supporters agree with the senator.

VerbAtEnd: Identifies verbs at the end of subordinate clauses, where the verb is not essential to the meaning or to the grammatical integrity of the sentence.

VerbInit: Identifies initial comment verbs.

ex: Note, however, that the apples were all green.

WeakAdj: Identifies weak adjectives.

ex: The simple solution is to not go.

WeakEquation: Identifies non-negative be-verb clauses that are equating only weak thematic information.

ex: The list was quite large.

WeakPrepPhrase: Identifies weak prepositional phrases.

ex: I would like to know your opinion as to your boss's behavior.

WeakPrepSeq: Identifies a sequence of prepositional phrases that are collectively weak in thematic content.

ex: It was built on the basis of my invention.

WeakSubjComp: Identifies weak subject complements that have extended contexts.

ex: The motivation for the research was the issue of how to teach pronunciation.

WhAdjClause: Identifies wh-element adjectival clauses that modify strong nouns or that do not carry supporting information.

ex: Boredom is especially trying for young people who have so few opportunities.

WhElement: Identifies wh-element clauses.

WhNounClause: Identifies noun clauses that are not essential to the grammatical integrity of the sentence.

ex: A model for the scientific investigation of language arose which took its problems almost exclusively from British sources.

Wordy: Identifies wordy expressions and single word replacements.

WhileSubordinators: Identifies 'time-indicating' subordinating conjunctions, such as 'while', that are not essential to the meaning or that could be replaced with punctuation.

ex: Please get me some flour while you are at the store.

Theme-Relational Tagging

Theme-relational tagging looks for certain grammatical or thematic relationships and follows a particular line of processing which tags all of the words from a specifically identified start point to a specifically identified end point. There are approximately 15 of these routines.

DelAllAux: Flags each auxiliary verb in each verb phrase.

ex: Bob can leave as soon as he is cleared of the charges.

DelAllButNp: Flags each word in the sentence that is not in the current noun phrase being pointed to.

DelClause: Flags each word in the clause (and imbedded clauses) being identified by the given word.

DelCurrPp: Flags each word in the prepositional phrase being pointed to.

DelDo: Flags each word in the direct object being pointed to.

DelLogicBreak: Flags each word in the same logical constituent group indicated by the given word.

DelMc: Flags each word in the main clause being pointed to.

DelObj: Identifes any word in an object being identified by the given word.

DelPp: Flags each prepositional phrase that is not essential to the meaning or to the grammatical integrity of the sentence.

DelRemainderSubj: Flags each word to the right of the current word that is part of the complete subject of the current clause.

DelStraySubj: Flags each word of the complete subject being pointed to when the subject is not essential to the meaning of the sentence.

DelToTheLeft: Flags each word to the left of the given word.

DelToTheRight: Flags each word to the right of the given word.

DelVerb: Flags the current word being pointed to if it is a verb.

DelVp: Flags all words if the verb phrase being pointed to.

Theme-Location Identification

Theme location identification searches for particular grammatical or thematic relationships and returns a location of where this word, phrase or clause starts in a sentence. There are approximately 35 of these routines.

FindIoThisPred: Returns the location of an indirect object in an identified predicate.

FindAllPp: Returns the location of a prepositional phrase where the last word of a string of phrases is needed to support any part of the prepositional phrase string from the beginning.

FindClauseType: Returns the type of subordinate clause at the given location.

FindClauseLevel: Returns the number of subordinate clause levels at the given location.

FindEndNp: Returns the location of the end of the given noun phrase.

FindEndLogicBreak: Returns the location of the end of the logical constituent group being pointed to.

FindEndObj: Returns the location of the end of the object being pointed to.

FindEndPp: Returns the location of the noun head of the prepositional phrase being pointed to.

FindEndSubj: Returns the location of the end of the complete subject being pointed to.

FindEndSc: Returns the location of the end of the subject complement being pointed to.

FindEndSubClause: Returns the location of the end of the subordinate clause being pointed to.

FindEndVp: Returns the location of the end of the verb phrase being pointed to.

FindLastNounInNp: Returns the location of the last noun head of the series of noun phrases identified by the given word.

FindLastVerbInVp: Returns the location of the last verb in the series of verb phrases identified by the given word.

FindNextMc: Returns the location of the start of the next main clause after the given word.

FindNextNoun: Returns the location of the next strong noun after the given word.

FindNextFirstNoun: Returns the location of the next noun after the given word.

FindNextKeptWd: Returns the location of the next word after the given word, where the word has not been marked as non-essential.

FindNounForThisAdj: Returns the location of the noun that the current adjective being pointed to modifies.

FindNounForThisPp: Returns the location of the noun head for the prepositional phrase being pointed to.

FindObject: Returns the location of the next object after the given word.

FindPrevNoun: Returns the location of the last noun before the current given word.

FindPrevNounVerb: Returns the location of the last noun or verb before the current given word.

FindPrepPrep: Returns the location of the last preposition before the current given word.

FindStartNp: Returns the location of the start of the noun phrase being pointed to.

FindPseudoVerbThisPred: Returns the location of the next participle in the predicate being pointed to.

FindStartMc: Returns the location of the start of the main clause being pointed to.

FindStartPp: Returns the location of the start of the prepositional phrase being pointed to.

FindStartSubClause: Returns the location of the start of the subordinate clause being pointed to.

FindStartVp: Returns the location of the start of the verb phrase being pointed to.

FindSubjThisPred: Returns the location of the simple subject after the current given word.

FindUndeletedWrd: Returns the location of the next word before the current given location that is not marked as non-essential to the meaning.

FindVerbThisPred: Returns the location of the first verb of the verb phrase for the current predicate being pointed to.

FindVerbThisSubj: Returns the location of the first verb of the verb phrase for the subject being pointed to.

Each of these assessments has its results stored for each word in the thematic context output area. Any application is now able to take advantage of this information, as well as the grammatical and stylistic information stored previously, to make intelligent observations about the grammar, theme and style of the text, and to perform some helpful operation against it, such as summarizing or outlining the text.

Appendix D, entitled "Theme Parser Source Code", contains source code for implementing the theme parsing system in accordance with one embodiment of the present invention. Appendix E, entitled "Code Heading", contains a list of defined headers corresponding to the theme parser source code of Appendix D. The following sample code shows how several typical theme tagging routines work. For a further explanation of how each thematic assessment is implemented in software, see Appendices D and E. The theme parser works by setting a generalization of what each routine is looking for, followed by specific contexts that can either exclude certain sentences from the tagging or specifically include them.

```
PersonalRef(word_ctr)
ub1 word_ctr;
{
  int vbos;
  int endvp;
  int endnp;
  int ctr;
  if (LEX(wd_personal_prn,word_ctr) &&
      LEX(wd_first_person_prn,word_ctr) &&
      verb_phrase[word_ctr+1]&&
      simple_subject[word_ctr]&&
      !subordinate_clause[word_ctr])
***The above section tests that the current word being pointed to by word_ctr
is a first-person, personal pronoun, functioning as the subject of the clause,
followed by a verb phrase. The clause must be a main clause, not a
subordinate clause. If these tests pass, the routine continues, otherwise it
returns. This test is the first general test to determine if a word is a personal
reference type. It is followed by secondary tests the constrain this
generalization in certain contextual conditions. Note in this sample routine
that the constraints are fairly specific and if met return without doing any
tagging. if the reference noun in question does not have these constraints,
then it is flagged by default.***
  {
    vbpos = FinfLastVerbInVp(word_ctr+1); this locates the last verb in
the verb phrase following the word after the current pronoun***
    if (IsNegVerbThisPred(vbpos) ||
        prep[vbpos+1])*** this checks the verb phrase for a negative element
anywhere in it, or for a preposition immediately following the last verb in the
verb phrase***
    {
      return ***** return when negative verb phrases encountered: We
CANNOT foresee any insurmountable problems.
    }
    ctr=vbpos+1;*** position to next word following the end of the verb
phrase
    if (pm[ctr])
    {
      return 0; *** return if a pronoun follows the verb phrase: I saw HIM the
following weekend.***
    }
    while (ctr <number_words-3 &&
           predicate[ctr]&&
           IsSameClause(vbpos,ctr))
    {
      if (conj[ctr]) &&
          IsWordCoordConj(ctr) &&
          ctr <number_words-2 &&
          verb[ctr+1])
      {
        vbpos = FinfLastVerbInVp(ctr+1);
        if (IsNegVerbThisPred(vpos))
        {
          return 0; ***** Return when the predicate extends with the context of a
coordinating conjunction followed by a verb phrase, and where the verb
phrase contains a negative element.
        }
        break;
      ctr++;
    }
    if (LEX(wd_that_clause_verb,vbpos) ||
        LEX(wd_emotion_attitude,vbpos))
    {
      if (LEX(wd_factual_know_verb,vbpos))
      {
        if (!(LEX(wd_speech_act,vbpos) &&
            LEX(wd_that_clause_verb,vbpos)))
        {
          return 0; ***** Checks the last verb in the verb phrase for being either a
that-clause verb (say, expect, see . . . ) or a verb of emotion or attitude
(disappoint, amazed), and where the verb is a factual knowledge verb, but not
a speech act verb AND a that-clause verb. Verbs will be those such as 'hate,
call . . . '***
        }
      }
    if (IsWordQuoteVerb(vbpos) &&
        vbpos <number_words-1 &&
        !IsWordThat(vbpos+1))
```

```
        {
            return 0; ***** Returns when the verb position is a quotative verb, not the
last word of the sentence, and where the following word is NOT abstractly
identified by the lexical flags set on 'that'. I will WRITE as soon as I can.***
            {
            endvp = FindEndVp(vbpos);
            if (endvp <number_words-1 &&
                IsInfinitiveClause(endvp+1))
            }
            return 0; ***** Returns when the end of the verb phrase (includes adverbs)
is followed by an infinitive clause.***
        }
        if (pm[endvp+1]&&
            !LEX(wd_nominative_case_pm,endvp+1))
        {
            endvp++; Positions pointer to a subjective case pronoun***
        }
        if (!noun_phrase[endvp+1]&&
            !conj[endvp+1]))
        {
            return 0; ***** Returns if the following word is not in a noun phrase and
not a conjunction.
        }
        if (noun_phrase[endvp+1])
        {
            endnp = FindEndNp(endvp+1);
            if (!(conj[endnp+1]&&
                IsWordTo(endnp+1)))
            {
            return 0; ***** Returns when the following word in a noun phrase, and
when the next word after the end of the noun phrase is not the an infinitive
clause (identified by the abstract features of the word 'to' tagged in a
conjunction position, which signals the subordination in the parser).
            }
        }
        for (;word_ctr <= endvp; word_ctr++)
            {
                ThemeTag[word_ctr][PersonalRefCode] = TRUE;
            ***Tags all of the words from word_ctr through the end of the verb
phrase as a personal reference: I believe that through revenue growth we will
make that goal.***
            }
        if (IsWordThat(word_ctr))
            {
                ThemeTag[word_ctr][PersonalRefCode] = TRUE;
            ***Tags the word that if in the following position after the previous
tags.***
            return 0;
            }
            else
            {
                word_ctr--; *Sets position at last tagged word.*
            }
        }
    }
}
AdverbNpInit(word_ctr)
int word_ctr;
{
  int nounpos;
  if (noun_phrase[word_ctr]&&
    !subordinate_clause[word_ctr]&&
    IsStartMc(word_ctr))
    {
***The above code is the opening generalization that looks for a noun phrase
that is not in a subordinate clause, and that starts a new main clause. This is
the initial condition necessary for determining initial noun phrase
adverbials. The following code will add constraints for particular contextual
conditions. Notice that the constraints are fairly general, and that with a few
basic tests being passed, and a few NOT conditions being met, the noun
phrase will be tagged of this type.***
        nounpos = FindLastNounInNP(word_ctr); ***Find the last noun in the
noun phrase currently being pointed to from above.***
        if (IsTimeNoun(nounpos) &&
            !simple_subject[nounpos]&&
            complete_subject[nounpos])
        {
***if the noun head is a time word, not the simple subject of the clause, but is
classified in the complete subject portion of the clause, then it is tagged as
being an introductory adverbial of time. ex: Early next morning, before dawn,
```

```
they fed the foxes.***
        TagNp(nounpos);
      }
   }
}
UselessPrepPhrase(word_ctr)
int word_ctr;
{
   int nounpos;
   int envpp;
   int vbpos;
   int temp;
   if (prep[word_tr]&& pp_adj[word_ctr])
   {*** Opening generalization is to allow all prepositional phrases that are
coded as adjectival types to be available for the useless prepositional phrase
tagging. The following code will apply constraints to this generalization.
Unlike the previous examples, this example does not return based on the
constraints as much as it only allows for the prepositional tagging inside
specific constraints.***
      nounpos=FindNounForThisPp(word_ctr);*** find the noun head for the
prepositional phrase.***
      if (nounpos == NOT_FOUND)
      {
          return 0; ***** return if a valid noun head is not found for the preposition.
***
      }
      if (IsGoodNounThisPp(word_ctr))
      {
          return 0; ***** return of the noun head is listed as an important supporting
word for other phrases. It cannot be flagged as useless if this is so.***
      }
      endpp = FindEndPp(word_ctr);*** Find the end of the prepositional phrase
(last word).***
      if (endpp <number_words-1 && IsWordThan(endpp+1))
      {
          return 0; ***** If the following word has the abstract characteristics of 'than'
then return.***
      }
      if (predicate[word_ctr])
      {
         vbpos = FindVerbThisPred(word_ctr);
         if (vbpos <number_words && IsDitransNeedPp(vbpos))
         {
             return 0; ***** If the word is in the predicate, and the main lexical verb for
the predicate is ditransitive, and is the type of word that needs supporting
prepositional information, then return. ex: The state declared the land as one
of its natural resources.***
         }
      }
      if (LEX(wd_personal_prn,nounpos) ||
          IsWordDemonstrative(nounpos) ||
          IsWordNeuterPrn(nounpos))
      {*** A second generalization is made above. This states that the noun
head identified earlier should be a personal pronoun, a demonstrative
pronoun, or a neuter gender pronoun to be considered in this section.***
         if (word_ctr>0 &&
             tag_table[word_ctr-1]!= TAG_WD &&
             (verb_phrase[word_ctr-1]||
             IsWordParticiple(word_ctr-1)))
         {
             return 0; ***** This constraint exits when the previous word has been
tagged by another routine as not high-priority and was either in a verb phrase
or a participle. ex: She stood for a while looking at everything there was to
see.***
         }
         TagPp(word_ctr);*** Now this prepositional phrase is tagged as being
weak (non-priority). ex: There is a viable alterative to it.***
      }
   }
   if (word_ctr &&
       prep[word&ctr]&&
       pp_adv[word_ctr]&&
       adj[word_ctr-1]&&
       !apunc[word_ctr-1]&&
       LEX(wd_comparative_adj,word_ctr-1))
   {***This routine allows another generalization to attempt the weak prep
phrase tagging. If the word is a preposition and functioning adverbially, and
of the prior word is an adjective and is not followed by any punctuation
mark, and if the prior word is also a comparative adjective, then the routine
continues. ex: it is better for you than for me.***
```

```
        nounpos = FindNounForThisPp(word_ctr);
     if (nounpos != NOT_FOUND &&
        IsWordThan(nounpos+_) &&
        !apunc[nounpos])
     {***This constraint will allow for the weak prep phrase tagging. If the
     noun head of the preposition is followed by the abstract nature of the word
     'than' and does not have any punctuation mark, then the prep phrase is
     tagged as weak.***
        TagPp(word_ctr);
     } ,
   }
}
```

Also, for a further explanation of the thematic output, see Appendix F entitled "Oracle ConText™ Linguistics Toolkit, Guide and Reference, Release 1.1."

USING THE THEME OUTPUT

There are three primary uses of the thematic information stored in the output section:

1. Kernel Sentence Generation
2. Topic Extraction
3. Content Extraction

Kernel Sentence Generation

The kernel sentence generator 140 processes the input discourse to generate the kernel sentences. A sentence can be said to have a main point, or kernel, that embodies the major pieces of information that the writer is communicating to the reader. The kernel is generally a subset of the sentence, with additional supporting detail mostly enforcing the main point. Much of the supporting information can be removed without detracting from either the logical truth of the sentence or the general understanding of the point being communicated. The grammar, style and theme of the sentence are used to make the determination of which words can be removed without violating either of the above guidelines. In addition, there is often not a single but a number of reductions that can be made, each moving towards the main kernel in small steps, the last step being the most tersely worded kernel sentence.

To generate these kernel sentences, certain thematic output settings will be checked, and certain low-content, grammatically neutral words removed. The correct thematic assessments are checked to give the desired kernel reduction level. Each of the following tags will be checked against each word in the sentence. Any word that has been thematically tagged with any of the assessments listed here will be removed from the sentence. The words that are left will form the new, reduced sentence.

Levels Of Reduction

When a new sentence is generated, thematically-tagged o functionality is removed, as opposed to reducing thematic aspects until a certain percent of the sentence remains. Four reduction levels are sufficient to represent summarized forms of sentences. Any more and the noticeable differences between levels becomes insignificant. The individual thematic contextual elements that are tested at each level should also be tested in the order given. If they are not, the reductions may vary. For example, some theme assessments look for 'stranded' clauses, where the prior word removals have caused a dause to be stranded from the main clause. In this case, it should be tested after most other tests, or it may be stranded after the test is made. Some of these routines are using the run-time theme assessments, since they cannot be tested in isolation.

Figure 4:
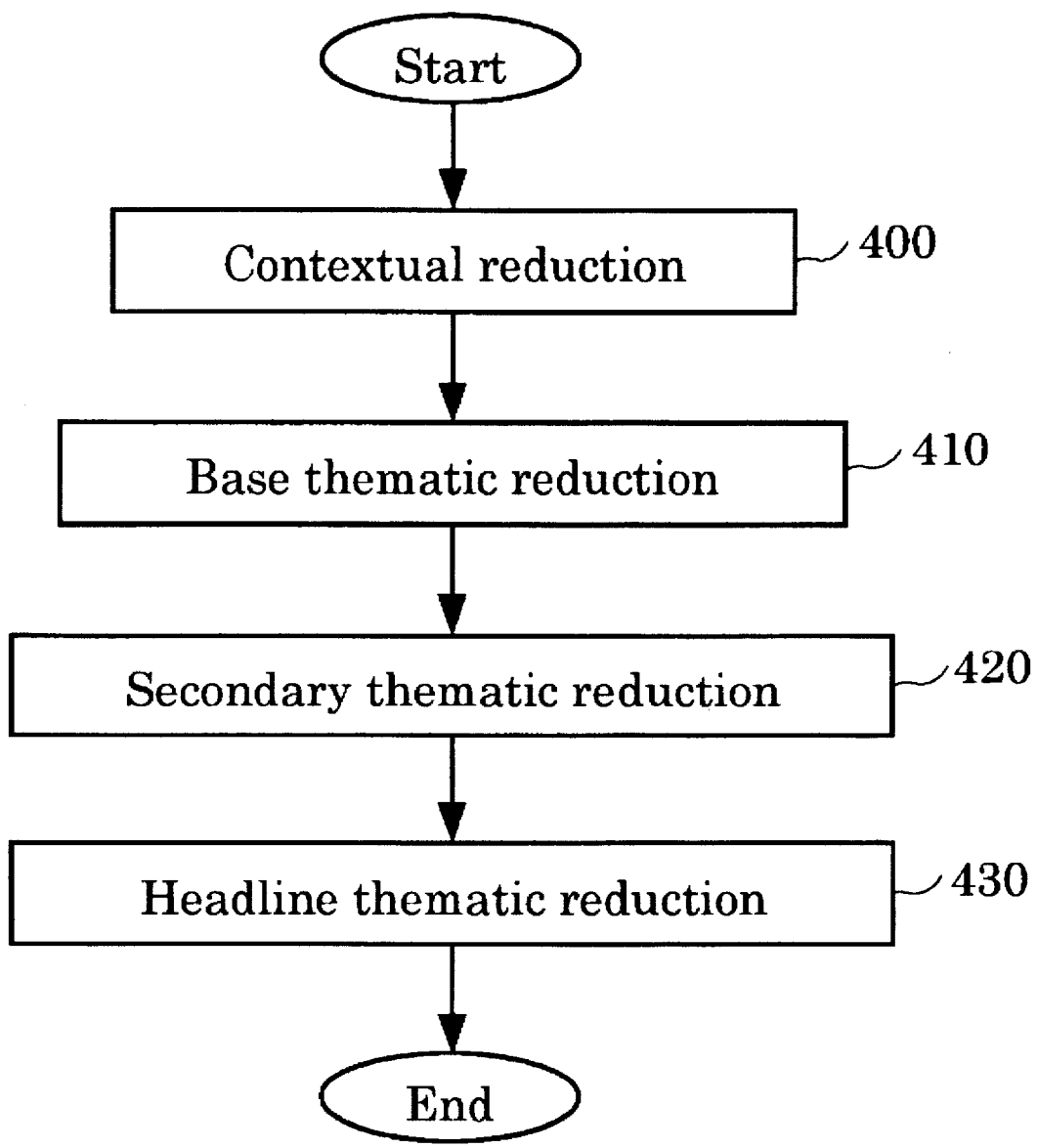
FIG. 4 illustrates the four levels of reduction for the generation of kernel sentences.

The four levels of reduction for the generation of kernel sentences are illustrated in a flow diagram of FIG. 4.

Specifically, the kernel sentence generator 140 performs contextual reduction as shown in block 400 and base thematic reduction as shown in block 410. Subsequently, the kernel sentence generator 140 performs secondary thematic reduction and headline thematic reduction as shown in blocks 420 and 430, respectively.

Contextual Reduction

Contextual reduction is a different type of reduction from the three thematic reductions. Thematic reductions function hierarchically, with each reduction level having potentially more information removed than did the previous reduction level. The contextual reduction may be smaller or larger than any of the thematic reductions, depending on the writing style of the sentence. From the original sentence, the following thematic contextual elements are tested and, if present, the corresponding words are removed from the sentence in this reduction type.

QuoteSource
ThatClauseAdj
TopicalClause
TrashStraySubj
OrphanAdjectivalClause
CryptoAdjClause
PrepPhrases
CryptoPrepPhrase
ThanPrepPhrase
PrepPrep
UselessPrepPhrase
AdverbInit
OrphanPp
AdverbialBetweenCommas
WeakSubjComp
ElliptedPassive
Adverbs
TopicalizerPhrase
TimeObject
PossProSubj
AdjDeterminer_b
DemonstrativeSubject
WhElement
ComparativeInSubjComp
MoreThan
WeakAdj
AdvInNp
DemonstrativeModifier
AgoAdverbial
PersonalRef
BogusSubject
StrayAdj
TimeSubject
NonRestrictiveRel
PureCoordConj
Article
PossProObj BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy

Base Thematic Reduction

This is the first of three hierarchical reductions for a sentence. It is intended that the resulting new sentence is both grammatical and logically correct. It should also be relatively easy to read. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
StrayAdj
StrayAdverbial
CorrelConj

Secondary Thematic Reduction

This is the second of three hierarchical reductions for a sentence. It is intended that the resulting new sentence is both grammatical and logically correct. It removes additional information that begins to send the new sentence into a headline mode, but not quite as terse. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
EllipedPassive
Adverbs
InfinClauseAfterObj
TopicalizerPhrase
TimeInObject
PossProSubj
AdjDeterminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
ReiThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash VerbAtEnd
InfinInfin
TrashMc
Semicolons
TrashWholeSent
StrayAdj
StrayAdverbial
CorrelConj

Headline Thematic Reduction

This is the last of three hierarchical reductions for a sentence. The new sentence is now reduced to a headline-style sentence, that is not necessarily grammatical nor logically correct. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
LowAdverbialClauses
WeakPrepPhrase
NegativePrnSubj
WhNounClause
BeVp NegativeAdj
WhAdjClause
MoreAdverbial
SweepNpTrash
UselessAdj
OrphanAdv
UselessPrnSubject
UselessPrnObj
TimeAdvInVp
StrayAdverbial As a final stage of processing in the kernel generation section, the punctuation for the sentence is rewritten in order to best reflect the new sentence structure.

Topic Extraction

FIG. 5 is a block diagram illustrating the operational flow of the topic extraction processor. After the new kernel sentences have been generated, five topic extractions are generated. For the software embodiment, five topic extraction routines are executed. The topic extraction processor 150 locates the main, new topic in the sentence, extracts its supporting context, and places the result in one or more of the five topic extraction areas in the topic extraction output 500. As shown in FIG. 5, the five topic extraction areas are:

1. Main Thematic Topic Group
2. Main Thematic Topic
3. Secondary Thematic Topic
4. Main Developed Topic
5. Main Proximity-Developed Topic Main Thematic Topic Group This topic extraction routine looks for the main topic in the sentence, along with its most important supporting context. If the main topic has already been developed, it looks for a secondary topic. If there is not a suitable secondary topic, or if the secondary topic has also already been developed, then the original main topic is selected. There are three processing phases used in establishing the main topic. First, certain thematic assessments are checked, and any associated words removed if they contain the tested assessments. These tests are:
QuoteSource
ThatClauseAdj
TopicalClause
AdverbInit
CommentInit
Appositive
WeakSubjComp Second, the main topic is extracted from the sentence elements that remain after the previous reductions:
SaveTopic Last, contextual elements of specific types are removed from the main topic:
PrepPrep
PrepPhrases
UselessPrepPhrase
SweepNpTrash
WeakAdj
PureCoordConj
UniversalPrn
ConjInNp
Transition
Factive
StrayAdj
DemonsAdj
DemonstrativeModifier
AdverbAfterVerb
AdvInNp
Compromiser
FocusAdv The result is now placed in the main topic extraction output area.

Main Thematic Topic

The main thematic topic is an extended classification of the previous thematic group. If the topic group is located in the actual 'thematic topic' position of the sentence, and not in a secondary focus position, then the main topic group is copied to this output area. This identifies the topic group not only as the main thematic topic of the sentence, but also indicates that it was in the strongest thematic position within the sentence.

Secondary Thematic Topic

The main thematic topic is copied to this output area, and any non-critical supporting information is removed. This moves the topic to just its main head, if possible. This is determined by checking the theme assessments for a 'strong noun' classification. If the topic's head noun is classified as a strong noun, then the supporting information is removed. Otherwise, it stays at this level. If there is nothing in the main thematic topic output area, this output area will also be empty.

Main Developed Topic

This output area copies the main thematic topic into it as long as the main thematic topic head has been a main thematic topic head within the last 20 topics. This indicates that this main topic is one that is not only prominent in the sentence, but also in the discourse at this point.

Main Proximity-Developed Topic

Whenever a main developed topic appears for a second time with a user specified range of text, it is output to the main proximity-developed topic. This output indicates that it is not only a main focal point within the document, but is being reinforced through the writing.

Content Extraction

The final phase of thematic output processing is to identify certain major thematic points in a sentence. FIG. 6 is a block diagram illustrating the operational flow of content extraction processing. This is a superset of the detailed thematic elements, being those that are notably important for turning free form text into structured database fields. The following outputs are produced in the content extraction output 600:
Thematic Head Words
Proper Names
Descriptions
Named Topics
Topic Indicators
Definitions
Developed Proper Names Thematic Head Words This output indicates that the identified word locations is a main focal point for a strong noun phrase. A strong noun phrase can either be a strong noun head or a noun head with strong support. Only the actual head word is specifically identified. Certain words that were initially flagged as strong or strong with support are removed from this list. The logic for this output is as follows:
+noun and
−pronoun and
(+strong noun or+strong support or+knowledgebase concept or (+gerund and simple subject)) and
−time noun and
−numbers and
−digits and
(+knowledgebase concept or not((+gerund or participle) and (−simple subject or −verb phrase))) and -pro verb and
-perfective verb If this condition is evaluated as true, then the word position is output to this area. Additionally, any adverbs that are marked as topicalizers are also flagged in this area. An example of these words is:

linguistically
aerodynamically

Proper Names

In this output area all of the proper names and places in the sentence are stored. Time nouns are excluded.

Descriptions

The 'description' output specifically identifies every set of noun plus descriptor. These appear as an appositive. Both sides of the description are stored. They must be able to express an equation of 'term1 is a term2'. An example of such a sentence that would generate these conditions is:

John Smith, a market analyst at Big Company, said . . .

This sentence will generate:

Term1(John Smith) is a Term2(market analysts)

Named Topics

This output area indicates topics that are specifically named in the context of a sentence. An example is:

This is a story about bears.

'Bears' is assigned to this output area.

Topic Indicators

This output area contains all strong orienter words. These are words that indicate a field of study or industry, such as:

computer software
prime interest rate
terrorist abduction

These words indicate the highest possible thematic significance in sentences.

Definitions

This output stores words that are defined in the context of the sentence with a 'be' verb relationship. An example of such a sentence is:

A bear is an animal that lives in the forest.

This would generate two terms with an 'is a' relationship:

Term1(bears) is a Term2(animals)

Developed Proper Names

This output indicates each proper name identified in 'Proper Names' above that mentioned more than one time within a user specified length of text.

COMPUTER SYSTEM

Figure 7:
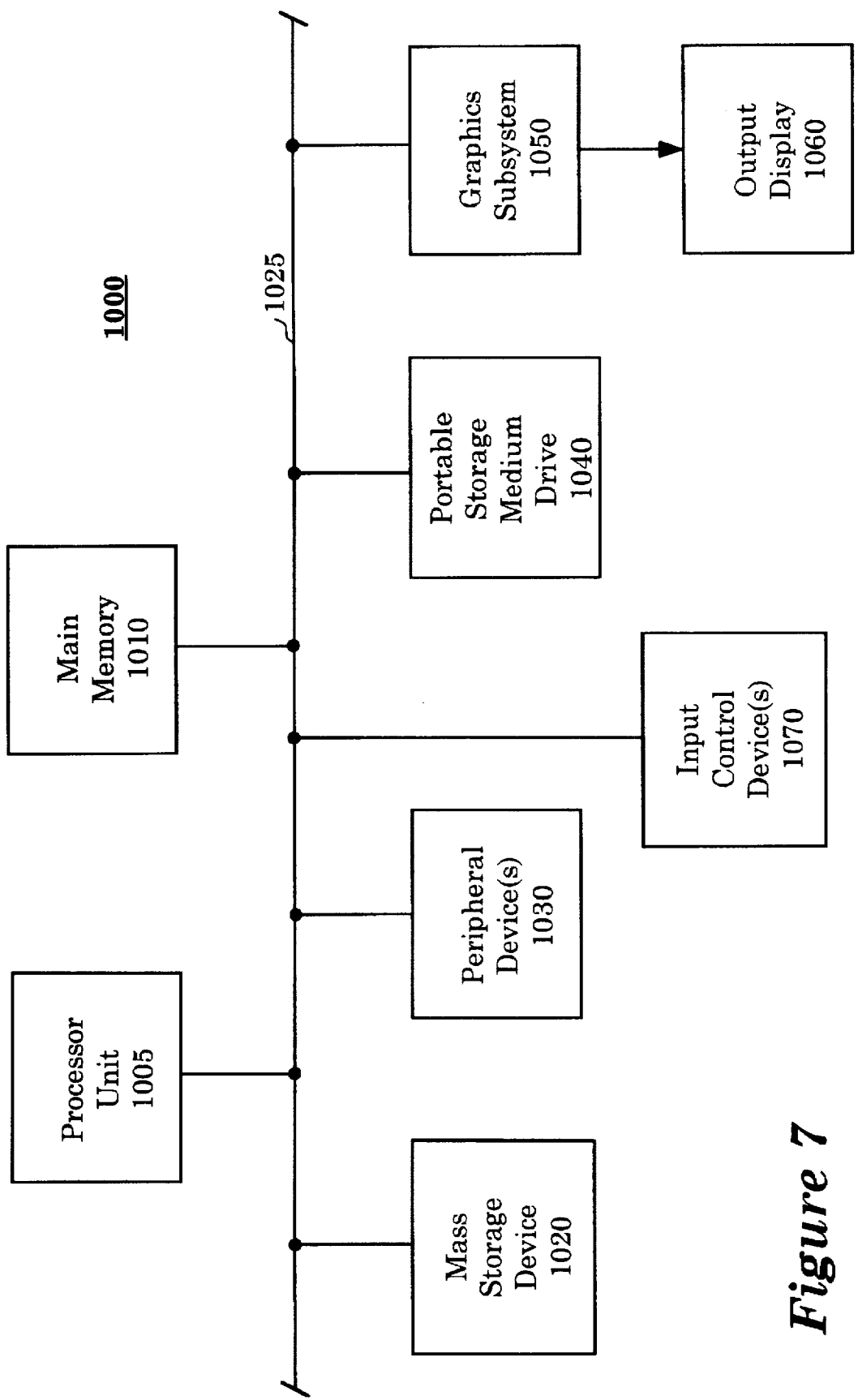
FIG. 7 illustrates a high level block diagram of a general purpose computer system in which the theme parsing system of the present invention may be implemented.

FIG. 7 illustrates a high level block diagram of a general purpose computer system in which the thematic parsing system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the thematic parsing system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 7 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the thematic parsing system software embodiment for loading to the main memory 1010.

The portable storage medium drive 1040 operates in conjunction with a portable non-volatile storage medium, such as a floppy disk or a compact disc read only memory (CD-ROM), to input and output encoded data and code to and from the computer system 1000. In one embodiment, the thematic parsing system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input discourse may be input to the computer system 1000 via a portable storage medium or a network for processing by the thematic parsing system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for parsing thematic context of input discourse, said method comprising the steps of:
   specifying a plurality of thematic constructions that define content of discourse;
   testing each of said thematic constructions with said input discourse to identify applicability of each of said thematic constructions to said input discourse; and
   generating a thematic context output for said input discourse by generating, for each word in said input discourse, a thematic tag to indicate applicability of each of said thematic constructions to said input discourse.

2. The method as set forth in claim 1, wherein the step of testing each of said thematic constructions with said input discourse comprises the steps of:

receiving contextual tags for said input discourse that identify contextual relationships for words in said input discourse; and utilizing said contextual tags to determine the applicability of each of said thematic constructions to said input discourse.

3. The method as set forth in claim 1, further comprising the steps of:

referencing, in combination, said thematic tags; and generating additional thematic tags based on a pre-defined relationship of said thematic tags.

4. The method as set forth in claim 1, further comprising the steps of:

referencing, in combination, pre-defined combinations of said thematic tags from said input discourse;

determining a location of said pre-defined combinations of said thematic tags in said input discourse; and generating a pointer to identify said location of said pre-defined combinations of said thematic tags in said input discourse.

5. The method as set forth in claim 1, wherein the step of testing each of said thematic constructions with said input discourse comprises the steps of:

storing, in a lexicon, a plurality of words and a plurality of flags for each word to indicate a plurality of definitional characteristics for each word;

accessing said lexicon to read said flags for at least one word; and utilizing said flags to determine the applicability of each of said thematic constructions to said input discourse.

6. The method as set forth in claim 5, further comprising the step of storing in said lexicon a noun thematic aspect for a plurality of nouns that characterizes a content carrying strength for each noun stored.

7. The method as set forth in claim 3, further comprising the steps of:

storing, in said lexicon, industry specific terminology;

comparing each word in said input discourse with said lexicon to determine whether said word is an industry specific term; and generating a thematic tag for a word to indicate that said word requires supporting information when said word is an industry specific term.

8. A method for determining thematic context of input discourse, said method comprising the steps of:

generating a thematic context output for said input discourse comprising a plurality of thematic tags, wherein said thematic tags indicate applicability of a plurality of thematic constructions to thematic units of said input discourse; and searching said thematic context output for pre-defined combinations of said thematic tags; and extracting, in combination, said thematic units corresponding to said pre-defined combination of said thematic tags to extract a theme for said input stream.

9. A method for generating kernel sentences from input discourse, said method comprising the steps of:

generating a thematic context output for said input discourse comprising a plurality of thematic tags, wherein said thematic tags indicate applicability of a plurality of thematic constructions including a plurality of thematic contextual elements for said input discourse; and accessing said thematic tags in said thematic context output; and removing words from each sentence of said input discourse if a thematic tag for a corresponding word indicates applicability to one of said thematic contextual elements, wherein words that exist define a kernel sentence.

10. A method for determining a topic for each sentence in an input discourse, said method comprising the steps of:

generating a thematic context output for said input discourse comprising a plurality of thematic tags, wherein said thematic tags indicate applicability of a plurality of thematic constructions that define content for said input discourse;

accessing said thematic tags in said thematic context output; and extracting a main topic for said sentence based on said thematic tags including extracting context words that support said main topic.

11. The method as set forth in claim 10, further comprising the step of extracting a secondary topic for said sentence including extracting supporting context words for said secondary topic based on said thematic tags.

12. The method as set forth in claim 10, wherein the step of extracting words that define said main topic of said sentence comprises the step of:

determining, from said thematic tags, whether a first set of thematic assessments exist, said first set of thematic assessments identifying words not used in said main topic of said sentence;

removing words from said sentence that are applicable to said first set of thematic assessments;

determining, from said thematic tags, whether a second set of thematic assessments exist, said second set of thematic assessments identify words that include contextual elements remaining in said sentence but that are not essential to conveying said main topic; and removing words from said sentence that are applicable to said second set of thematic assessments, wherein words that exist define said main topic of said sentence.

13. A method for extracting content in an input discourse, said method comprising the steps of:

generating a thematic context output for said input discourse comprising a plurality of thematic tags, wherein said thematic tags indicate applicability of a plurality of thematic constructions that define content for said input discourse; and extracting, for each sentence in said input discourse, words that identify at least one of a plurality of major thematic points based on said thematic tags, wherein said words extracted identify content for each sentence in said input discourse.

14. The method as set forth in claim 13, wherein at least one of a plurality of major thematic points comprise thematic head words.

15. The method as set forth in claim 13, wherein at least one of a plurality of major thematic points comprise proper names.

16. The method as set forth in claim 13, wherein at least one of a plurality of major thematic points comprise descriptions.

17. The method as set forth in claim 13, wherein at least one of a plurality of major thematic points comprise named topics.

18. The method as set forth in claim 13, wherein at least one of a plurality of major thematic points comprise topic indicators.

19. The method as set forth in claim 13, wherein at least one of a plurality of major thematic points comprise definitions.

20. The method as set forth in claim 13, wherein at least one of a plurality of major thematic points comprise developed proper names.

21. A computer readable medium for storing instructions, which when executed by a computer, causes the computer to perform the steps of:

storing a plurality of thematic constructions that define content of discourse;

testing each of said thematic constructions with said input discourse to identify applicability of each of said thematic constructions to said input discourse; and generating a thematic context output for said input discourse by generating, for each word in said input discourse, a thematic tag to indicate applicability of each of said thematic constructions to said input discourse.

22. The computer readable medium as set forth in claim 21, wherein the instructions for testing each of said thematic constructions with said input discourse comprise instructions for:

receiving contextual tags for said input discourse that identify contextual relationships words in said input discourse; and utilizing said contextual tags to determine the applicability of each of said thematic constructions to said input discourse.

23. The computer readable medium as set forth in claim 21, further comprising instructions for:

referencing, in combination, said thematic tags; and generating additional thematic tags based on a pre-defined relationship of said thematic tags.

24. The computer readable medium as set forth in claim 21, further comprising instructions for:

referencing, in combination, pre-defined combinations of said thematic tags from said input discourse;

determining a location of said pre-defined combinations of said thematic tags in said input discourse; and generating a pointer to identify said location of said pre-defined combinations of said thematic tags in said input discourse.

25. The computer readable medium as set forth in claim 21, wherein instructions for testing each of said thematic constructions with said input discourse comprise instructions for:

storing a lexicon comprising a plurality of words and a plurality of flags for each word to indicate a plurality of definitional characteristics for each word;

accessing said lexicon to read said flags for at least one word; and utilizing said flags to determine the applicability of each of said thematic constructions to said input discourse.

26. The computer readable medium as set forth in claim 25, further comprising instructions for storing in said lexicon a noun thematic aspect for a plurality of nouns that characterizes a content carrying strength for each noun stored.

27. The computer readable medium as set forth in claim 23, further comprising instructions for:

storing, in said lexicon, industry specific terminology;

comparing each word in said input discourse with said lexicon to determine whether said word is an industry specific term; and generating a thematic tag for a word to indicate that said word requires supporting information when said word is an industry specific term.

28. A computer readable medium for storing instructions, which when executed by a computer, causes the computer to perform the steps of:

generating a thematic context output for said input discourse comprising a plurality of thematic tags, wherein said thematic tags indicate applicability of a plurality of thematic constructions to thematic units of said input discourse; and searching said thematic context output for pre-defined combinations of said thematic tags; and extracting, in combination, said thematic units corresponding to said pre-defined combination of said thematic tags to extract a theme for said input stream.

29. A computer readable medium for storing instructions, which when executed by a computer, causes the computer to perform the steps of:

generating a thematic context output for said input discourse comprising a plurality of thematic tags, wherein said thematic tags indicate applicability of a plurality of thematic constructions including a plurality of thematic contextual elements for said input discourse; and accessing said thematic tags in said thematic context output; and removing words from each sentence of said input discourse if a thematic tag for a corresponding word indicates applicability to one of said thematic contextual elements, wherein words that exist define a kernel sentence.

30. A computer readable medium for storing instructions, which when executed by a computer, causes the computer to perform the steps of:

generating a thematic context output for said input discourse comprising a plurality of thematic tags, wherein said thematic tags indicate applicability of a plurality of thematic constructions that define content for said input discourse; and accessing said thematic tags in said thematic context output; and extracting a main topic for said sentence based on said thematic tags including extracting context words that support said main topic.

31. The computer readable medium as set forth in claim 30, further comprising instructions for extracting a secondary topic for said sentence including extracting supporting context words for said secondary topic based on said thematic tags.

32. The computer readable medium as set forth in claim 30, wherein the step of extracting words that define said main topic of said sentence comprises the step of:

determining, from said thematic tags, whether a first set of thematic assessments exist, said first set of thematic assessments identifying words not used in said main topic of said sentence;

removing words from said sentence that are applicable to said first set of thematic assessments;

determining, from said thematic tags, whether a second set of thematic assessments exist, said second set of thematic assessments identify words that include contextual elements remaining in said sentence but that are not essential to conveying said main topic; and removing words from said sentence that are applicable to said second set of thematic assessments, wherein words that exist define said main topic of said sentence.

33. A computer readable medium for storing instructions, which when executed by a computer, causes the computer to perform the steps of:

generating a thematic context output for said input discourse comprising a plurality of thematic tags, wherein said thematic tags indicate applicability of a plurality of thematic constructions that define content for said input discourse; and extracting, for each sentence in said input discourse, words that identify at least one of a plurality of major thematic points based on said thematic tags, wherein said words extracted identify content for each sentence in said input discourse.

34. The computer readable medium as set forth in claim 33, wherein at least one of a plurality of major thematic points comprise thematic head words.

35. The computer readable medium as set forth in claim 33, wherein at least one of a plurality of major thematic points comprise proper names.

36. The computer readable medium as set forth in claim 33, wherein at least one of a plurality of major thematic points comprise descriptions.

37. The computer readable medium as set forth in claim 33, wherein at least one of a plurality of major thematic points comprise named topics.

38. The computer readable medium as set forth in claim 33, wherein at least one of a plurality of major thematic points comprise topic indicators.

39. The computer readable medium as set forth in claim 33, wherein at least one of a plurality of major thematic points comprise definitions.

40. The computer readable medium as set forth in claim 33, wherein at least one of a plurality of major thematic points comprise developed proper names.

41. An apparatus for determining themes in an input discourse, said apparatus comprising:

means for specifying a plurality of thematic constructions that define content of discourse;

means for testing each of said thematic constructions with said input discourse to identify applicability of each of said thematic constructions to said input discourse; and means for generating a thematic context output for said input discourse by generating, for each word in said input discourse, a thematic tag to indicate applicability of each of said thematic constructions to said input discourse.

42. An apparatus for determining thematic context of an input discourse, said apparatus comprising:

means for generating a thematic context output for said input discourse comprising a plurality of thematic tags, wherein said thematic tags indicate applicability of a plurality of thematic constructions to thematic units of said input discourse; and means for searching said thematic context output for pre-defined combinations of said thematic tags; and means for extracting, in combination, said thematic units corresponding to said predefined combination of said thematic tags to extract a theme for said input stream.

43. An apparatus for generating kernel sentences from input discourse, said apparatus comprising:

means for generating a thematic context output for said input discourse comprising a plurality of thematic tags, wherein said thematic tags indicate applicability of a plurality of thematic constructions including a plurality of thematic contextual elements for said input discourse;

means for accessing said thematic tags in said thematic context output; and means for removing words from each sentence of said input discourse if a thematic tag for a corresponding word indicates applicability to one of said thematic contextual elements, wherein words that exist define a kernel sentence.

44. An apparatus for determining a topic for each sentence in an input discourse, said apparatus comprising:

means for generating a thematic context output for said input discourse comprising a plurality of thematic tags, wherein said thematic tags indicate applicability of a plurality of thematic constructions that define content for said input discourse; and means for accessing said thematic tags in said thematic context output; and means for extracting a main topic for said sentence based on said thematic tags including extracting context words that support said main topic.

45. An apparatus for extracting content in an input discourse, said apparatus comprising:

means for generating a thematic context output for said input discourse comprising a plurality of thematic tags, wherein said thematic tags indicate applicability of a plurality of thematic constructions that define content for said input discourse; and means for extracting, for each sentence in said input discourse, words that identify at least one of a plurality of major thematic points based on said thematic tags, wherein said words extracted identify content for each sentence in said input discourse.

* * * * *